US012710784B2

(12) United States Patent
Blackburn et al.

(10) Patent No.: US 12,710,784 B2
(45) Date of Patent: Aug. 18, 2026

(54) CIRCUITS AND METHODS FOR ASYNCHRONOUS ADIABATIC QUANTUM FLUX PARAMETRON SYSTEM DESIGN

(71) Applicant: Massachusetts Institute of Technology, Cambridge, MA (US)

(72) Inventors: L. Camron Blackburn, Somerville, MA (US); Neil Gershenfeld, Cambridge, MA (US); Alexander Noble Wynn, Carlisle, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 287 days.

(21) Appl. No.: 18/097,196

(22) Filed: Jan. 13, 2023

(65) Prior Publication Data

US 2024/0411340 A1 Dec. 12, 2024

Related U.S. Application Data

(60) Provisional application No. 63/299,356, filed on Jan. 13, 2022.

(51) Int. Cl.
*G06F 1/12* (2006.01)
*G06N 10/20* (2022.01)

(52) U.S. Cl.
CPC ............... *G06F 1/12* (2013.01); *G06N 10/20* (2022.01)

(58) Field of Classification Search
CPC ........................................................ G06F 1/12
See application file for complete search history.

(56) References Cited

U.S. PATENT DOCUMENTS 11,973,497 B1 * 4/2024 Kawa ..................... H03K 3/037
2023/0115533 A1 * 4/2023 Meaney ................ G06F 13/385 714/5.1
2024/0259002 A1 * 8/2024 L?hteenm?ki ......... G06N 10/40

FOREIGN PATENT DOCUMENTS

WO WO-2024052585 A1 * 3/2024 ......... H03K 19/0019

OTHER PUBLICATIONS

Blackburn, L. Cameron, "Superconducting Asynchronous Logic for Ultra-low Power High Performance Computing" Sep. 2021, MIT, https://hdl.handle.net/1721.1/142825.*

(Continued)

*Primary Examiner* — Jaweed A Abbaszadeh
*Assistant Examiner* — Cheri L Harrington
(74) *Attorney, Agent, or Firm* — Norma E. Henderson

(57) ABSTRACT

A method for operation of AOFP circuits includes accepting data arriving at any phase of a clock cycle, synchronizing the data to a known phase of a subsequent clock cycle, and providing the synchronized data to an AQFP circuit during the known phase of the subsequent clock cycle. The accepting and synchronizing of the data may be performed by a phase synchronizer and/or by a token-passing circuit. An asynchronous AOFP device includes at least one AQFP circuit and an activation phase synchronizer and/or token-passing circuit. The phase synchronizer may comprise a multiplexed array of QFP Buffers that samples each input phase of the clock cycle through a weak constant zero cell and outputs the logical OR of all input clock phases, propagating an input signal on any activation phase to a first phase output of the next activation cycle. The data may be passed from the phase synchronizer to a token-passing circuit, which passes the accepted and synchronized data to the AQFP during the known phase of the subsequent clock cycle. The token-passing circuit may comprise at least one driving QFP circuit that is triggered by the presence of the (Continued)

accepted data and activates at least one variable activation QFP circuit to store the accepted data in a buffer or propagate it to the AQFP circuit during the known phase of the subsequent clock cycle.

10 Claims, 30 Drawing Sheets

(56) References Cited

OTHER PUBLICATIONS

N. Takeuchi, C. L. Ayala, O. Chen and N. Yoshikawa, "A Feedback-Friendly Large-Scale Clocking Scheme for Adiabatic Quantum-Flux-Parametron Logic Datapaths," in IEEE Transactions on Applied Superconductivity, vol. 29, No. 5, pp. 1-5, Aug. 2019, doi: 10.1109/TASC.2019.2904480.*

Yahya et al.and J. Vounckx, N. Azemard, and P. Maurine (Eds.): PATMOS 2006, LNCS 4148, pp. 583-592, 2006.*

* cited by examiner

CIRCUITS AND METHODS FOR ASYNCHRONOUS ADIABATIC QUANTUM FLUX PARAMETRON SYSTEM DESIGN

RELATED APPLICATIONS

This application claims the benefit of U.S. Provisional Application Ser. No. 63/299,356, filed Jan. 13, 2022, the entire disclosure of which is herein incorporated by reference.

STATEMENT REGARDING FEDERALLY SPONSORED RESEARCH OR DEVELOPMENT

This invention was made with U.S. Government support under Grant Number FA8650-19-2-7921, awarded by Defense Advanced Research Projects Agency (DARPA) and Air Force Research Laboratory (AFRL), and Grant Number FA8702-15-D-0001, awarded by the Air Force. The Government has certain rights in this invention.

FIELD OF THE TECHNOLOGY

The present invention relates to superconducting computing frameworks and, in particular, to Adiabatic Quantum Flux Parametron (AQFP) logic devices.

BACKGROUND

High performance computing is crucial to a wide range of research fields, such as, for example, machine learning, multiphysics modeling, and climate science. Many areas of expertise require an ever increasing computational complexity. Currently, both high performance computing and superconducting electronics suffer from disadvantages. In particular, high performance computing is bottlenecked by increasing power demands and memory bandwidth, while superconducting electronics are bounded in circuit complexity due to a limit on the number of switching devices on a single chip.

Supercomputers are generally limited by their expensive power consumption. According to the Top500 benchmarking list, as of June 2021, Supercomputer Fugaku in Japan is the world's fastest supercomputer and requires 29.9 MW of power with 15.42 GFlops/Watts [E. Strohmaier, J. Dongarra, H. Simon, M. Meuer, and H. Meuer, "Top 500 the list", Top 500, June 2021]. The accompanying Green500 benchmarking list ranks the world's most energy efficient supercomputers, and as of June 2021 the MN-3 supercomputer cluster in Japan is the world's most energy efficient supercomputer with 29.7 GFlops/Watts [E. Strohmaier, J. Dongarra, H. Simon, M. Meuer, and H. Meuer, "Green 500 the list", Green 500, June 2021]. This places state of the art supercomputers at an energy efficiency on the order of $10^{-10}$ W/Flops.

Superconducting electronics can provide a compelling ultra-low power alternative to classical computation. It has been shown that an 8-bit superconducting ALU with $10^3$ JJs operating at 5 GHz has an energy dissipation of 1.4 aJ per operation [N. Takeuchi, T. Yamae, C. L. Ayala, H. Suzuki, and N. Yoshikawa, "An adiabatic superconductor 8-bit adder with 24 kbt energy dissipation per junction," Applied Physics Letters, vol. 114, no. 4, p. 042602, 2019]. This implies 10 nW power dissipation ($1.5\times10^{-18}$ J/op $5\times10^9$ $s^{-1}$). Assuming this power performance could be extrapolated to a chip with the maximum number of switching devices, ($10^6$), with $10^{10}$ op/s, then a superconducting supercomputer could have a power efficiency of $10^{-18}$ W/ops. Accounting for the $10^3$ W/W cryogenic cooling overhead cost, the net power efficiency would be on the order of $10^{-15}$ W/flops.

Theoretically, there should be a $10^5$ order of magnitude improvement in power efficiency for superconducting supercomputing. The difficulty in realizing this projection comes when scaling the superconducting circuit design—there are physical limitations to how small and dense a Josephson junction can be on a single chip. Therefore, any reasonably complex superconducting processor needs to extend to a multi-chip module and take on the added design complexity and communication overhead which that entails.

The DICE framework uses a starting node of commercial off-the-shelf microcontrollers to create three-dimensional LEGO-like building blocks for application specific hardware design [Z. Fredin, J. Zemanek, C. Blackburn, E. Strand, A. Abdel-Rahman, and P. Rowles, "Discrete integrated circuit electronics (dice)", 2020 IEEE High Performance Extreme Computing Conference (HPEC), pp. 1-8, September 2020]. DICE nodes scale in a reconfigurable direct-write automated assembly process and communicate through an asynchronous token passing protocol that allows hardware design to adapt and grow to optimize software tasks. A driving motivation for DICE is the spatial alignment of software instructions with hardware layout. For example, when programming a deep neural network, it is desirable that the weights calculated from one layer be stored physically close to where the next layer is computed, in order to save time and energy in retrieving values from memory. In traditional CPU architecture, the programmer does not easily have control over where information is stored in the hardware; however, the DICE framework and design tool allows the programmer to align the physics of their software with the physics of their hardware, resulting in speed and power optimizations. Providing the programmer with control over the spatial location of memory storage also has important applications in secure and trusted systems, allowing better protection against buffer overflow vulnerabilities.

Asynchronous Logic Automata (ALA) is a spatial computing framework composed of finite volumes of information communicating through locally exchanged state tokens [N. Gershenfeld, "Aligning the representation and reality of computation with asynchronous logic automata," Computing, vol. 93, pp. 91-102, 2011]. The heterogeneous automata that comprise ALA are simple logic gates and token manipulators. The logic gates behave as simple combinatorial finite state machines. They receive one or two input data values, perform some computation, and pass along the output. Each cell completes on a single unit time step. Computation is only executed if the input/s is/are present and the output is empty, which is verified by an acknowledgment signal between the cells input and output. This ensures that proper sequential logic is maintained, with the added benefit that power is not required when there is nothing to do, as opposed to what is the case in most clocked architectures.

Communication lines between ALA cells indicate present/absent and high/low data values. This can be done with dual-rail logic or binary logic, both requiring at least two wires for communication. Dual-rail logic encoding has each wire representing a different data value, meaning that the data signal will always be high and the value depends on which line the signal comes from. In this protocol, it is not valid for both wires to be high at the same time, and if both are low, then the value is null and the token is absent. On the other hand, binary logic encoding has one wire encoding data with true/1/high and false/0/low, while the other indicates the present/high or null/low value. In this protocol, the data line is only checked when the present line is high. The method of encoding depends on the underlying technology implementation and does not change the functionality of the ALA cells.

There are also token-manipulating ALA cells, which perform actions like copying or deleting tokens. Both these cells have a control input and a data input—the control input determines whether or not the delete/copy action is performed, while the data line holds the token value. If a token is being copied, then the token will be propagated without sending an acknowledgement signal at the input, causing the same token to be propagated again at the next time step. If a token is deleted, then the reverse happens—the acknowledgment signal will be sent to the input without propagating the token to the output.

An adiabatic quantum flux parametron (AQFP) is a two-terminal superconducting device capable of amplifying or inverting digital input signals at near-kT energy dissipation. This ultra-low power device is desirable for myriad reasons, including high performance accelerator applications as CMOS processors become more and more limited by energy consumption, as well as co-localized classical processors for quantum computing systems. Additionally, AQFP logic circuits can operate at relatively fast clock speeds (up to 10 GHz) compared to CMOS circuits, with lower energy dissipation than the more conventional rapid single flux quantum (RSFQ) superconducting circuits. Promising performance results have been realized on AQFP processors; however, scaling these results to larger computing systems faces engineering challenges due to device density and power distribution. AQFP circuits require a multi-phase activation signal to propagate logic. If data is not properly aligned with the activation phase, it can be dropped or shifted to an incorrect phase and disrupt circuit operation.

SUMMARY

The present invention is related to a modular, asynchronous, superconducting computing framework, known as superconducting Discrete Integrated Circuit Electronics ("Super-DICE"), which is an offshoot of the DICE framework and realigns hardware layout with software dataflow in order to create scalable, distributed computing systems from basic circuit building blocks. Super-DICE building blocks pull from a heterogeneous set of nodes and have an asynchronous nature that allows information to flow through the system with more freedom than systolic array architectures. Projecting the simple circuit design performance to large-scale high performance computing systems, Super-DICE aims to achieve a $10^3$ order of magnitude improvement in power consumption, while still accounting for the cryogenic cooling overhead of the superconducting electronics. Beyond the dramatic power performance improvement seen with this logic technology and architecture, it also permits designers to rapidly prototype hardware computing optimizations without needing to go through the expensive and time consuming process of fully custom ASIc design.

In some aspects, the invention includes use of a discrete set of logic gates implemented using Adiabatic Quantum Flux Parametron (AQFP) logic. AQFP logic devices can achieve picosecond gate delays with zeptojoule ($10^{-21}$ J) switching energy, just bordering the theoretical Landauer limit for computing energy demands, by adiabatically switching the location of a single flux quanta in a double-well potential. The modular architecture design realigns hardware layout with software dataflow to support construction of scalable, distributed computing systems from basic circuit building blocks.

The present invention includes methods and devices for asynchronous operation of AQFP circuits. It includes a family of devices developed to decouple the AQFP logic from activation phase clocking, including, but not limited to a phase synchronizer, a binary-encoded token passing mechanism for QFP logic (QFBB) (single input, two-data input, and no acknowledgement), a dual-rail to binary token converter, QFP implementation of a C-element, and QFP implementation of a PCFB. The AQFP logic has previously required meticulously synchronous logic design because of its dependence on the activation phase. The asynchronous AQFP of the invention converts the multi-phase ac-biasing from a clock signal that is integral to the AQFP logic operation into a power grid with the logic operating more flexibly at an abstraction layer above it. Motivated by the energy efficiency of superconducting electronics, the invention redefines traditional processor architecture by discretizing large-scale system integration into a heterogeneous set of building blocks that blur the line between hardware and software with a reconfigurable, asynchronous spatial computing system.

In one particular aspect, an example embodiment of the invention comprises an activation phase synchronizer: a simple circuit that will accept data arriving on any phase and re-align it to a known phase of the subsequent cycle. The phase synchronizer can be useful for mitigating clock skew across clock domains or play an important role in asynchronous design where the arrival time of data may be unknown.

In another particular aspect, an example embodiment of the invention comprises a circuit for asynchronous token buffering between modular gates, which can be assembled as digital materials to create scalable, complex 3D computing structures. In a preferred embodiment, the token-passing mechanism includes at least one driving QFP circuit configured to be triggered by the presence of input data and at least one variable activation QFP circuit configured to store the input data in a buffer or propagate it to the AQFP circuit during the known phase of the subsequent clock cycle.

In one aspect, the invention is a method for operation of Adiabatic Quantum Flux Parametron (AOFP) circuits that includes accepting data arriving at any phase of a clock cycle, synchronizing the accepted data to a known phase of a subsequent clock cycle, and providing the accepted and synchronized data to at least one AQFP circuit during the known phase of the subsequent clock cycle. The accepting and synchronizing of the data may be performed by at least one phase synchronizer and/or by at least one token-passing circuit. The phase synchronizer may comprise a multiplexed array of QFP Buffers that samples each input phase of the clock cycle through a weak constant zero cell and outputs the logical OR of all input clock phases, propagating an input signal on any activation phase to a first phase output of the next activation cycle. The accepted and synchronized data may be passed from the phase synchronizer to at least one token-passing circuit, which passes the accepted and synchronized data to the AQFP circuit during the known phase of the subsequent clock cycle. The token-passing circuit may comprise at least one driving QFP circuit that is triggered by the presence of the accepted data and activates at least one variable activation QFP circuit to store the accepted data in a buffer or propagate it to the AQFP circuit during the known phase of the subsequent clock cycle.

In another aspect, the invention includes an asynchronous Adiabatic Quantum Flux Parametron (AOFP) device comprising at least one AQFP circuit and at least one circuit adapted for accepting data arriving at any phase of a clock cycle and for synchronizing and providing the accepted data to the AQFP circuit at a known phase of a subsequent clock cycle. The circuit for accepting data may comprise at least one activation phase synchronizer and/or at least one token-passing circuit. The activation phase synchronizer may comprise circuitry configured for accepting data input during any time of an activation cycle, removing temporal uncertainty associated with the data input by propagating the value of the data input to an output signal of a known clock phase, providing the output signal to at least one Adiabatic Quantum Flux Parametron circuit, and, in the absence of an input signal, outputting a predetermined value. The activation phase synchronizer circuitry may comprise a multiplexed array of Quantum Flex Parametron Buffers that samples each input phase of the activation cycle through a weak constant zero cell and outputs the logical OR of all input phases, propagating an input signal on any activation phase to a first phase output of the next activation cycle. The token-passing circuit may comprise at least one driving QFP circuit configured to be triggered by the presence of accepted data and at least one variable activation QFP circuit configured to store the accepted data in a buffer or propagate it to the AQFP circuit during the known phase of the subsequent clock cycle.

In a further aspect, the invention includes an activation phase synchronizer for asynchronous AOFP operation that includes circuitry configured for accepting data input during any time of an activation cycle, removing temporal uncertainty associated with the data input by propagating the value of the data input to an output signal of a known clock phase, providing the output signal to at least one APFQ circuit, and, in the absence of an input signal, outputting a predetermined value. In a preferred embodiment, the circuitry comprises a multiplexed array of QFP Buffers that samples each input phase of the activation cycle through a weak constant zero cell and outputs the logical OR of all input phases, propagating an input signal on any activation phase to a first phase output of the next activation cycle.

BRIEF DESCRIPTION OF THE DRAWINGS

Other aspects, advantages and novel features of the invention will become more apparent from the following detailed description of the invention when considered in conjunction with the accompanying drawings, wherein.

DETAILED DESCRIPTION

Figure 1:
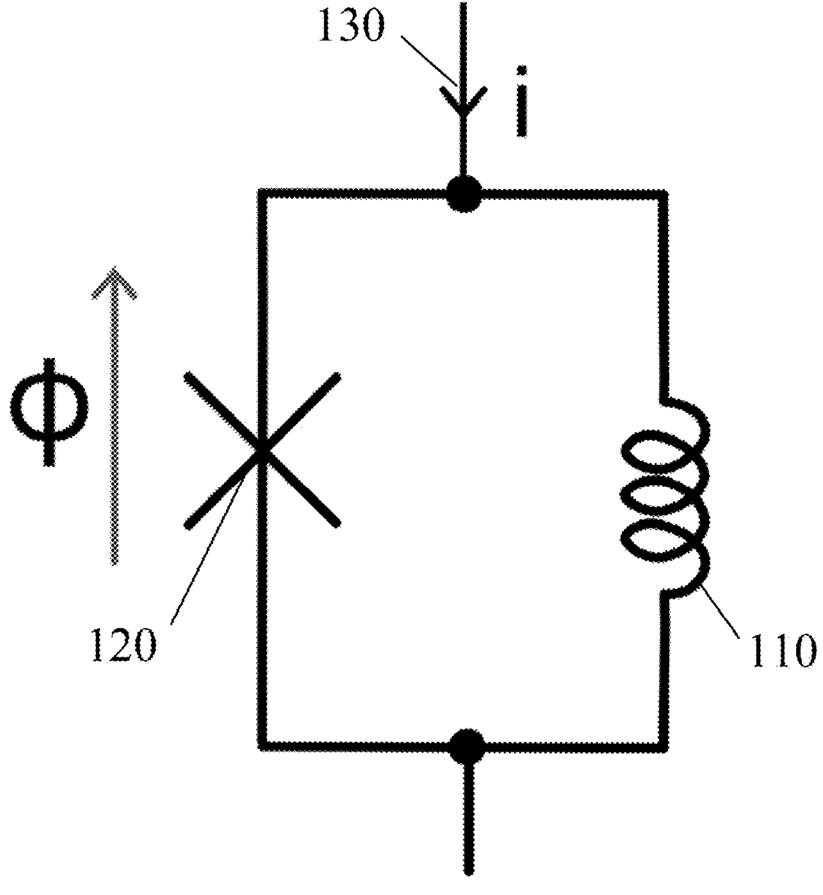
FIG. 1 is a schematic of an example prior art superconducting loop with Josephson Junction.

The present invention includes a set of superconducting logic building blocks, as well as an asynchronous token buffer mechanism for communicating between these logic blocks, which serves as a toolkit for building modular, asynchronous, and scalable ultra-low power superconducting computing systems.

The active device of the present invention, the Quantum Flux Parametron (QFP), is the core building block of the Super-DICE circuit library and utilizes device physics that are similar to popular qubit devices, particularly the flux qubit circuit. In contrast to qubit circuits, however, the present invention instead exploits the quantum properties for their ultra-low energy operation in classical computation. In one sense, the invention creates VLSI from Adiabatic Quantum Flux Parametron (AQFP) logic, although the asynchronous and modular architecture of Super-DICE is very different from the earlier RISC-like approach of Ayala et al. [C. L. Ayala, T. Tanaka, R. Saito, M. Nozoe, N. Takeuchi and N. Yoshikawa, "MANA: A Monolithic Adiabatic iNtegration Architecture Microprocessor Using 1.4-zJ/op Unshunted Superconductor Josephson Junction Devices," *IEEE Journal of Solid-State Circuits*, vol. 56, no. 4, pp. 1152-1165, April 2021] and facilitates a more scalable end-to-end workflow without complicated custom EDA tools.

The Adiabatic Quantum Flux Parametron (AQFP) is a candidate for ultra-low energy computation, with near-$k_\beta T$ ln 2 energy dissipation per bit-operation [N. Takeuchi, T. Yamae, C. L. Ayala, H. Suzuki, and N. Yoshikawa, "An adiabatic superconductor 8-bit adder with 24 kbt energy dissipation per junction," Applied Physics Letters, vol. 114, no. 4, p. 042602, 2019]. The availability of relatively mature fabrication processes for superconducting integrated circuit fabrication [S. K. Tolpygo, V. Bolkhovsky, T. J. Weir, A. Wynn, D. E. Oates, L. M. Johnson, and M. A. Gouker, "Advanced fabrication processes for superconducting very large-scale integrated circuits," IEEE Transactions on Applied Superconductivity, vol. 26, no. 3, pp. 1-10, 2016], an extremely uniform cell design for AQFP circuits based on majority-inverter logic [N. Takeuchi, Y. Yamanashi, and N. Yoshikawa, "Adiabatic quantum-flux-parametron cell library adopting minimalist design," Journal of Applied Physics, vol. 117, no. 17, p. 173912, 2015], and recent development of EDA tools for large-scale AQFP design [Y. Murai, C. L. Ayala, N. Takeuchi, Y. Yamanashi, and N. Yoshikawa, "Development and demonstration of routing and placement eda tools for large-scale adiabatic quantum-flux-parametron circuits," IEEE Transactions on Applied Superconductivity, vol. 27, no. 6, pp. 1-9, 2017; C. L. Ayala, O. Chen, and N. Yoshikawa, "Aqfptx: Adiabatic quantumflux-parametron timing extraction tool," IEEE International Superconductive Electronics Conference (ISEC), pp. 1-3, 2019; C. J. Fourie, K. Jackman, M. M. Botha, S. Razmkhah, P. Febvre, C. L. Ayala, Q. Xu, N. Yoshikawa, E. Patrick, M. Law, Y. Wang, M. Annavaram, P. Beerel, S. Gupta, S. Nazarian, and M. Pedram, "Coldflux superconducting eda and tcad tools project: Overview and progress," IEEE Transactions on Applied Superconductivity, vol. 29, no. 5, pp. 1-7, 2019] provide significant practical benefits for the realization of large-scale circuits and systems.

In one aspect of the invention, modifications to a QFP are made to turn the buffer into various single-bit logic devices. These AQFP logic devices can achieve picosecond gate delays with zeptojoule ($10^{-21}$ J) switching energy by adiabatically switching the location of a single flux quanta in a double-potential well. Since the motivation for the invention is ultra-low power dissipation distributed across multiple asynchronously communicating chips, the choice of superconducting logic technology was determined based on bit energy, which is compared for various technologies in Table 1.

Table 1 presents a Bit-Energy comparison of SCE Logic Families. While the values in Table 1 are for different circuit designs and taken from various energy review papers, so they do not provide a direct comparison, an inference of general performance comparison may still be made. It should also be noted that static power is also not accounted for in these values, which can account for significant overhead. This is why practical Reciprocal Quantum Logic (RQL) circuits are much more energy efficient than Rapid Single Flux Quantum (RSFQ), even though Table 1 shows RQL as having a larger switching energy. Mukhanov et. al. provides a more comprehensive overview and comparison of SFQ logic families [O. A. Mukhanov, "Energy-efficient single flux quantum technology", IEEE Transactions on Applied Superconductivity, vol. 21, no. 3, pp. 760-769, 2011], although AQFP is left out of that analysis

TABLE 1

| Logic Family | Switching Energy (aJ) |
|---|---|
| 90 nm CMOS | 2,620 |
| 7 nm CMOS | 111 |
| Rapid Single Flux Quantum (RSFQ) | 0.15 |
| Reciprocal Quantum Logic (RQL) | 0.68 |
| Adiabatic Quantum Flux Parametron (AQFP) | 0.0014 ($23\ k_B T$) |

As shown in Table 1, AQFP is the clear leader in lowest power requirements, operating almost at the theoretical Landauer Limit [R. Landauer, "Irreversibility and heat generation in the computing process", IBM Journal of Research and Development, vol. 5, no. 3, pp. 183-191, 1961], on the order of kT.

When describing flux transfer devices, it is useful to define the generalized flux angle, Φ, as the time integral of voltage, and analyze circuits based on their current-flux characteristics, $$\Phi = \int v\,dt.$$

Using the second of the Josephson relations, $$I = I_c \sin\phi$$

$$V = \frac{\Phi_0}{2\pi}\frac{d\phi}{dt}$$

where $I_c$ is the critical current, i.e. the maximum supercurrent, determined by the fabrication process and geometry of the junction; ϕ is the phase difference of the electron wave functions across the junction; and $\Phi_0$ is the magnetic flux quantum defined as $$\Phi_0 = \frac{h}{2e} = 2.07 \times 10^{-15}\ \text{Wb},$$

and the magnetic flux quantum, the generalized flux angle, can also be described by $$\Phi = \frac{\Phi_0}{2\pi}\phi.$$

To analyze QFPs, it is easiest to begin by describing the current-flux characteristics of a superconducting loop 110, large enough to hold a non-zero amount of flux quanta, with a single Josephson junction 120, as exemplified by the schematic shown in FIG. 1. By convention, a positive phase, $\phi$, moves in the opposite direction of the current. Also, FIG. 1 includes an externally applied current 130, i, which, for now, will be considered to be zero.

Like all circuits, Kirchoff's law must hold such that $I_{junc}+I_{ind}=0$. Assuming static conditions, the only flux in the circuit arises from the self-inductance of the loop, $$\Phi=LI_{ind},$$

and the junction current is given by the first Josephson relation (assume static conditions, which simplifies the RCSJ model). Therefore, the current equation for this circuit can be expressed as $$I_j \sin\phi + \frac{\Phi_0}{2\pi}\frac{\phi}{L} = 0.$$

To determine the stable state of the circuit, the energy can be analyzed, given that $U=U_{ind}+U_j$. The energy for an inductor is defined as $$U_{ind} = \frac{1}{2}LI^2 = \frac{1}{2}\frac{\Phi^2}{L},$$

$$U_j = \int v \cdot idt = -I_c\frac{\Phi_0}{2\pi}\cos\phi.$$

Introducing an energy normalization factor, $E_j$, and inductance normalization factor, $L_j$, to simplify the equation, the Hamiltonian of a superconducting loop with a tunneling junction is $$u = \frac{U}{E_j} = \frac{1}{2}b\phi^2 - \cos\phi$$

where $$E_J = I_c\frac{\Phi_0}{2\phi} \text{ and}$$

$$L_j = \frac{\Phi_0}{2\pi I_c} \rightarrow L = L_j/b$$

Local extrema can be found by taking the first derivative of the Hamiltonian with respect to phase, which also returns the current equation $$\frac{du}{d\phi} = 0 \rightarrow b\phi + \sin\phi = 0,$$

and stable points are determined by $$\frac{d^2u}{d\phi^2} > 0 \rightarrow b + \cos\phi > 0.$$

When the loop is driven by some external current, the system is shifted from one stable state to another, such that $$\sin\phi + b\phi = i.$$

The applied current can be expressed in terms of a flux angle, $\beta$, given $i=b\beta$, which corresponds to a shift of $b\phi$ by some amount $\beta$ on the load line, $$u = \frac{1}{2}b(\phi-\beta)^2 - \cos\phi.$$

The loop can also be driven by an external flux through a transformer, i.e. coupled inductor. When an external flux is added, the generalized flux angle for the circuit is no longer solely dependent on the loop's self-inductance. The applied flux imposes a bias to the phase difference across the junction, $$\Phi + \Phi_{ext} = \frac{\Phi_0}{2\pi}\phi \rightarrow \Phi = \frac{\Phi_0}{2\pi}(\phi-\alpha).$$

This bias behaves like a shift in the negative sine plot, and with a large enough phase can cause the current to jump states, $$u = \frac{1}{2}b\phi^2 - \cos(\phi-\alpha).$$

The Adiabatic Quantum Flux Parametron (AQFP) is the building block of the superconducting architecture of the present invention. Unlike RSFQ, which passes fluxons from loop to loop, the QFP encodes information through the location of a single fluxon in a double-well potential. Information propagates when neighboring QFPs push the other's fluxon into the appropriate well for computation.

Figure 2:
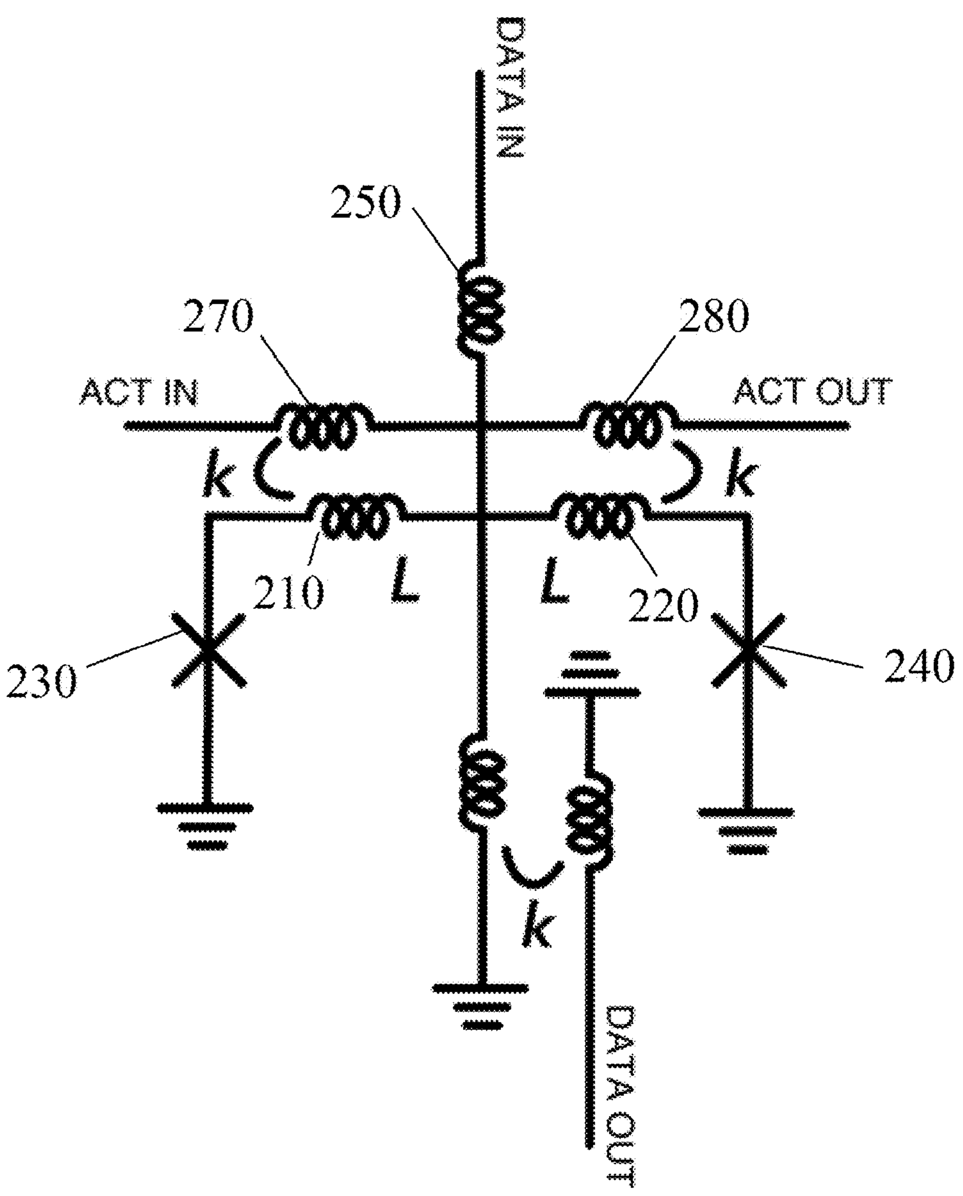
FIG. 2 is a schematic of a prior art Quantum Flux Parametron (QFP) device.

QFPs are driven by ac activation signals, which create an unstable equilibrium at a previously stable point, causing the system to "fall" into one state or another based on some input phase angle. A schematic for the QFP is shown in FIG. 2. The device is made of two superconducting loops 210, 220, each with a Josephson junction 230, 240, a load inductor 250, and an activation transformer 270, 280, with opposite parity biases.

Following an analysis similar to the foregoing, the total energy for the QFP is $$U = \frac{1}{2}b(\phi-\beta)^2 - \frac{\Phi_0}{2\pi}I_j\cos(\phi-\alpha) - \frac{\Phi_0}{2\pi}I_j\cos(\phi+\alpha).$$

Introducing new normalization parameters to simplify the equation gives $$u = \frac{1}{2}b(\phi-\beta)^2 - \cos\phi\cos\alpha$$

where $$E_Q = 2I_c\frac{\phi_0}{2\pi} \text{ and}$$

$$B = \frac{L_Q}{L} \rightarrow L_Q = \frac{\Phi_0}{2\pi}\frac{1}{2I_c}$$

where $\beta$ is the input flux angle, $\alpha$ is the transformer activation flux angle, and $\phi$ is the output flux angle.

Figure 3A:
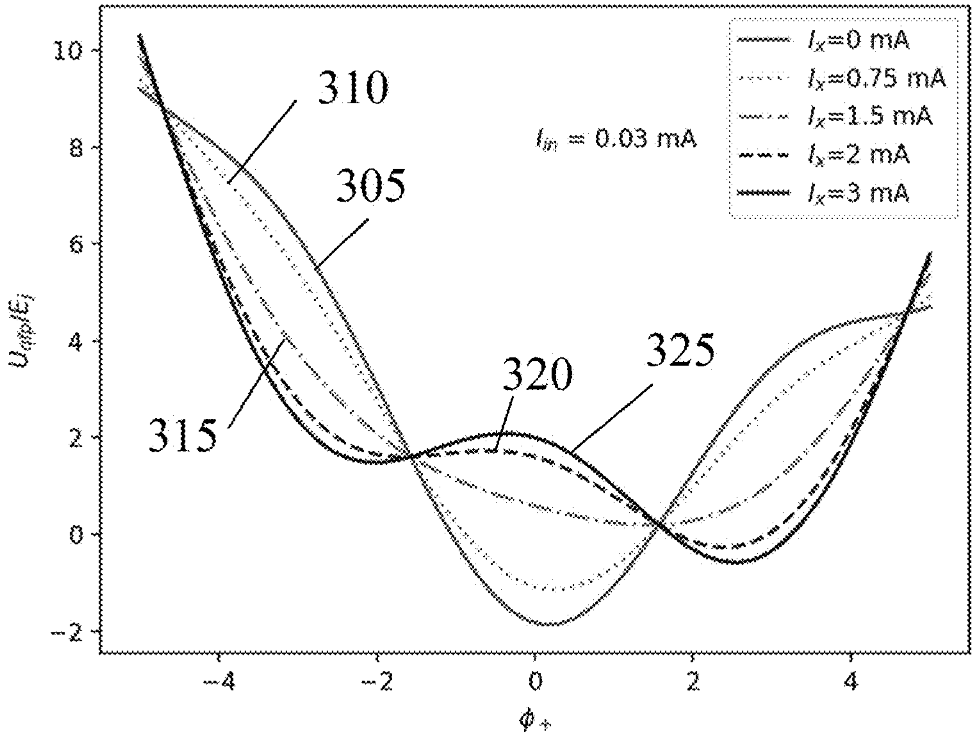
FIG. 3A is a plot depicting the QFP of FIG. 2 switching to the "1" state and FIG. 3B is a plot depicting the "0" state, based on the input current signals being high (positive) and low (negative).
Figure 3B:
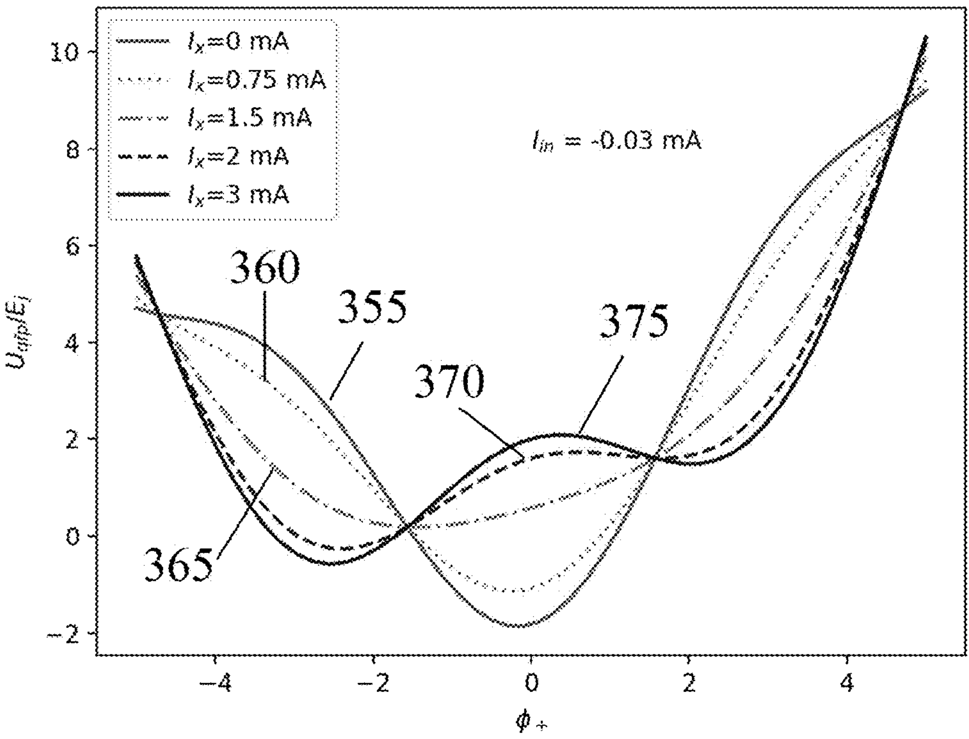

FIG. 3A is a plot showing the QFP switching to the "1" state for $I_{in}$=0.03 mA, $I_x$=0 mA 305, $I_x$=0.75 mA 310, $I_x$=1.5 mA 315, $I_x$=2 mA 320, and $I_x$=2 mA 325, and FIG. 3B is a plot showing the "0" state for $I_{in}$=0.03 mA, $I_x$=0 mA 355, $I_x$=0.75 mA 360, $I_x$=1.5 mA 365, $I_x$=2 mA 370, and $I_x$=2 mA 375, based on the input current signals being high (positive) and low (negative), respectively.

Figure 4:
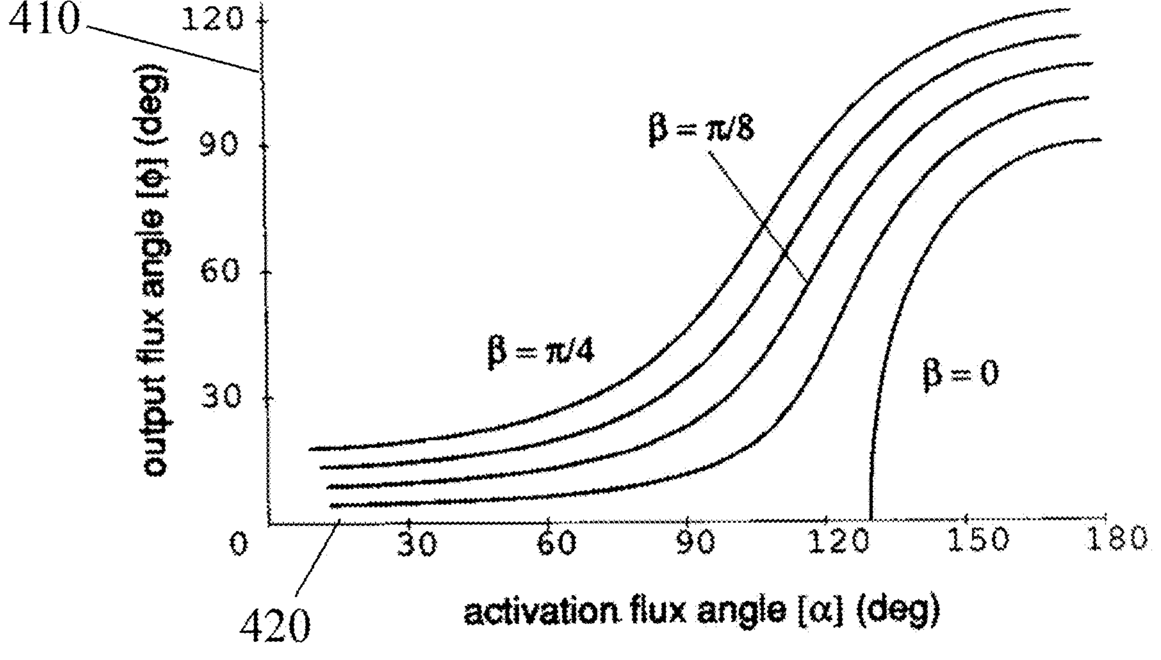
FIG. 4 is a plot depicting the relationship between prior art QFP output flux and the activation flux angle for various input values.

The relationship between the output flux angle 410 and the activation flux angle 420 for various input values is shown in FIG. 4 [from M. Hosoya, W. Hioe, J. Casas, R. Kamikawai, Y. Harada, Y. Wada, H. Nakane, R. Suda, and E. Goto, "Quantum flux parametron: a single quantum flux device for Josephson supercomputer," IEEE Transactions on Applied Superconductivity, vol. 1, no. 2, pp. 77-89, 1991]. FIG. 4 demonstrates that the QFP is able to store memory when the activation angle remains high, since the value of the output flux remains high even when β is removed.

Figure 5:
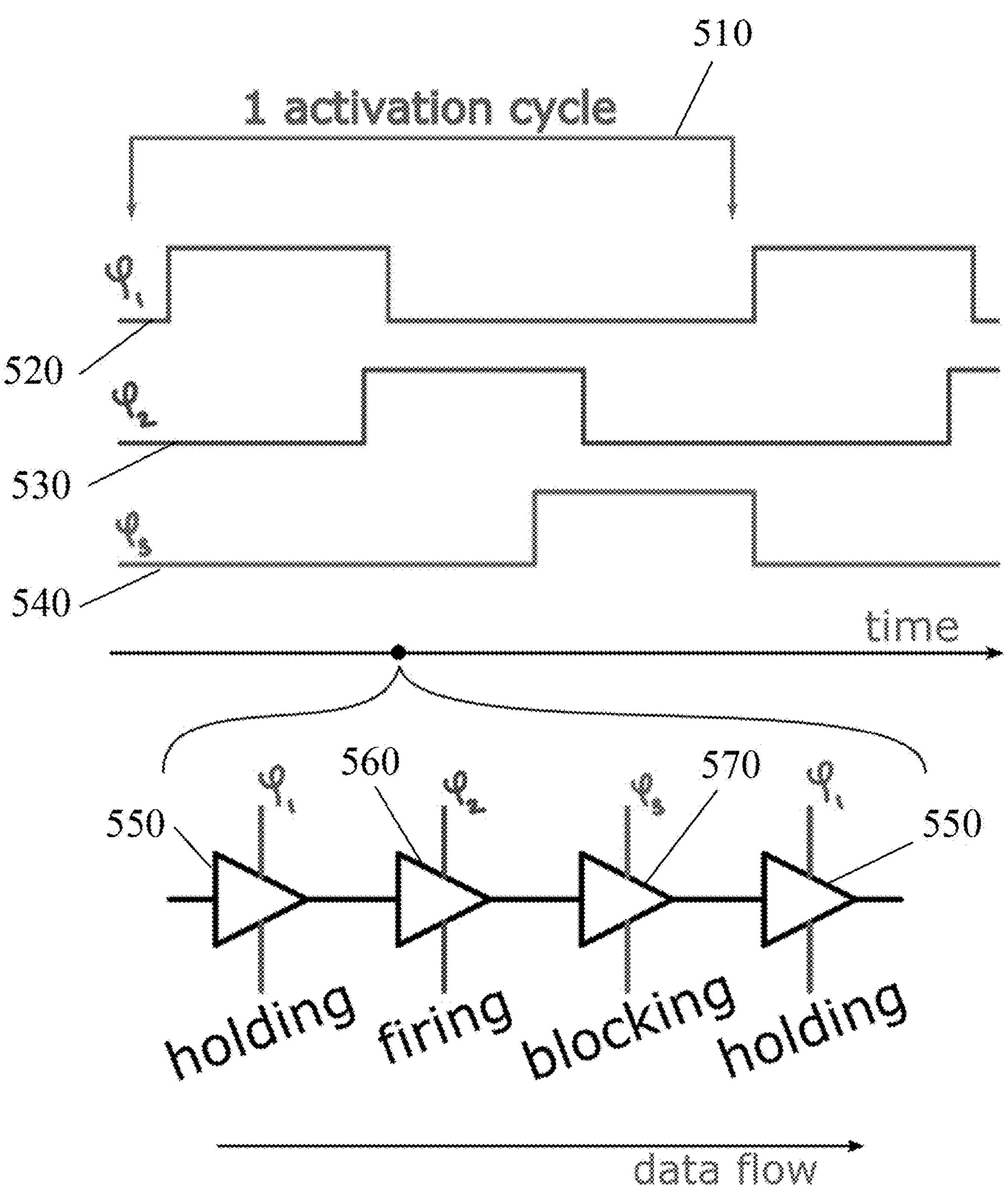
FIG. 5 is a schematic depicting a three-phase activation signal propagating through prior art QFP buffers.

QFPs are two-terminal devices, meaning that there is no distinction between input and output. Because of this, they can be used for reversible computing, but this complicates combinational circuits since back propagation of outputs, i.e. "relay noise", can interfere with correct operation. Therefore, when propagating flux values through a chain of QFP devices, it is best to use at minimum a three-phase activation signal, so that QFPs alternate between active, quenching, and blocking stages. These stages and where they occur in the activation signal cycle 510 are shown in FIG. 5. As shown in FIG. 5, each buffer 520, 530, 540 passes through cyclical stages: holding (holding data value) 550, firing (receiving data signal) 560, and blocking (inactive to stop back propagation of data) 570.

All previous analysis and explanation has assumed ideal conditions for QFP operation. However, in reality, there are various internal and external issues that can lead to errors and improper output. A common issue is imbalance between the junction critical currents, referred to as $\delta I_c$ noise, arising from various inconsistencies in the fabrication process. Large $\delta I_c$ can cause the stable state of the superimposed Josephson junction loops to be shifted from 0, meaning that the wrong output could be amplified if the input signal is not strong enough to overcome the imbalance bias. Other common internal issues arise from activation transformer imbalance, transformer self-inductance, and antagonistic coupling between transformers. Additionally, external issues from neighboring QFPs or additional circuit elements, such as relay noise, homophase noise (i.e. clock skew between QFPs sharing activation phases), and input signal fluctuations can also cause errors. Most of these errors can be accounted for by strengthening input signals and activation transformers and improving fabrication engineering, although most corrections do introduce important performance trade-offs. Further details on QFP optimizations through auxiliary circuits can be found in Hioe and Goto [W. Hioe, "Quantum Flux Parametron: A Single Quantum Flux Superconducting Logic Device", Vol. 2, World Scientific, 1991].

Figure 6:
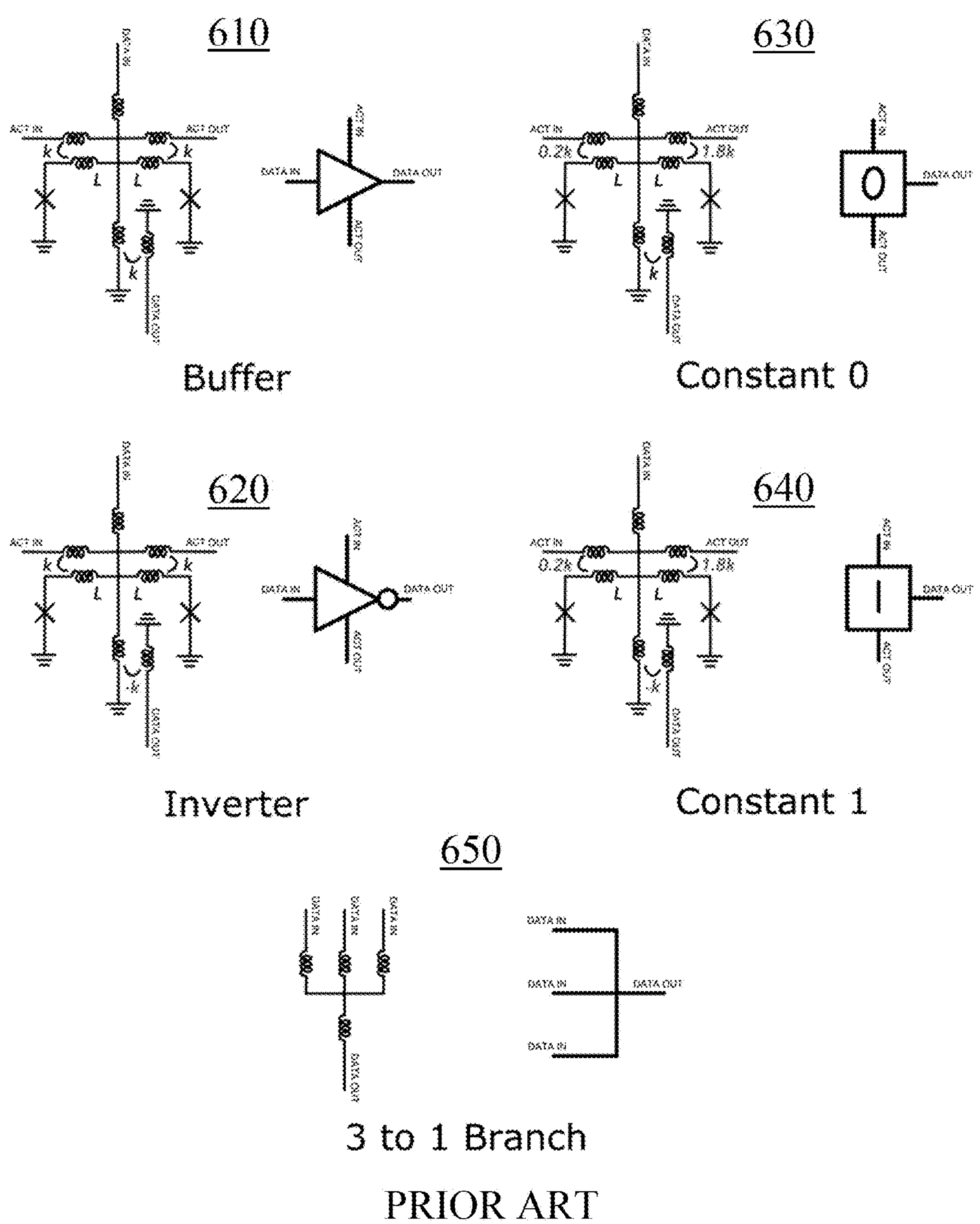
FIG. 6 depicts an example prior art Adiabatic Quantum Flux Parametron (AQFP) Cell Library, with junction-level schematics (left) and logic-level schematics (right).

QFP Logic cells. Slight modifications can be made to the original QFP cell to change its function from an amplifier to an inverter or constant output. Combining this with the ability for wired majority logic through branches of inductor lines, QFP circuits are capable of universal logic. The basic building blocks for a QFP cell library were originally optimized by Takeuchi et. al. [N. Takeuchi, Y. Yamanashi, and N. Yoshikawa, "Adiabatic quantum-fluxparametron cell library adopting minimalist design," Journal of Applied Physics, vol. 117, no. 17, p. 173912, 2015]. Junction-level schematics and abstracted symbols for all elements are shown in FIG. 6.

The original QFP circuit 610 serves as the buffer cell, amplifying the input signal with the same parity. The inverter cell 620 is the same as the buffer, except that the coupling constant for the output signal is inverted so that the final output has the opposite parity of the initial input. The constant cells 630, 640 will return either a 0/low 630 or 1/high 640 output regardless of input signal, due to an imbalance between the activation transformers.

Additionally, a 3-to-1 branch cell 650 is used for a wired majority gate. Expressed in Boolean logic, the output of the branch cell is determined by x=MAJ(A, B, C)=AB+BC+CA. With the majority gate, AND, NAND, and OR gates can all be easily developed by passing A, B, and C input values through different combinations of buffers, inverters, and constants.

AQFP Logic Gates. In one aspect, the present invention uses AQFP circuits to implement parts of the Asynchronous Logic Automata (ALA) framework. The ALA framework is described in detail in U.S. Pat. Nos. 8,013,629, 8,035,414, 8,692,575, and 8,766,665, all of which are incorporated by reference herein in their entirety. The basic logic gates needed for the ALA library were built using the QFP logic cells shown in FIG. 6. QFP-level implementation schematics for each AQFP logic gate are shown in FIG. 7.

Figure 7:
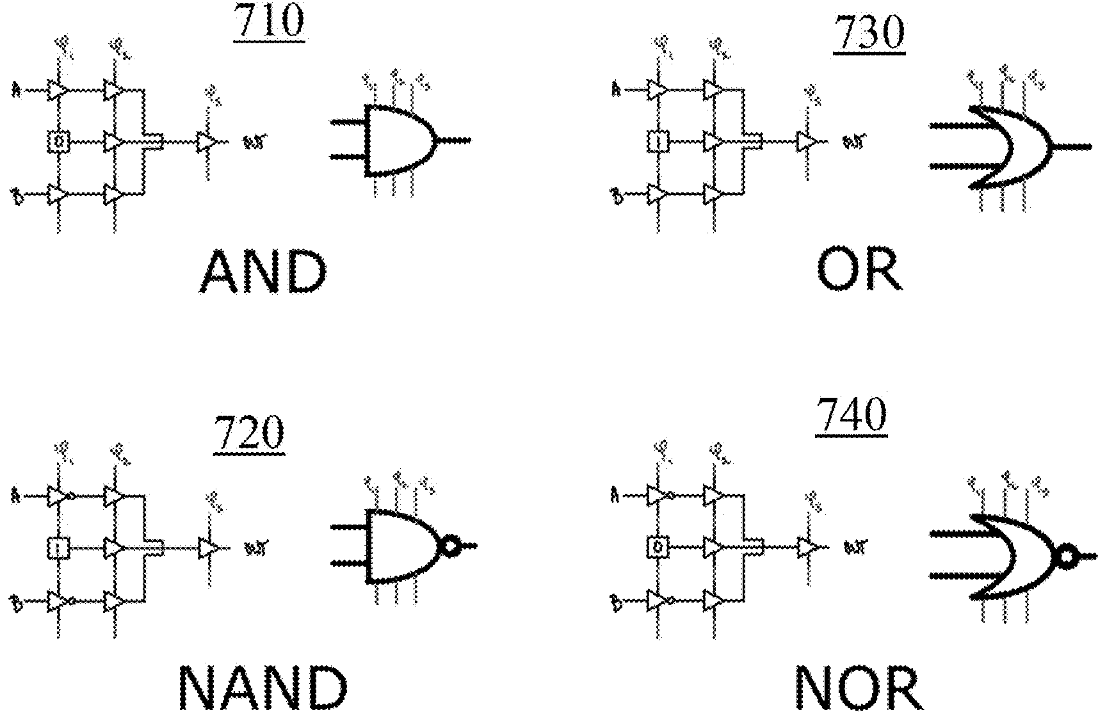
FIG. 7 depicts example prior art AQFP logic gates for an example Asynchronous Logic Automata (ALA) library.
Figure 7:
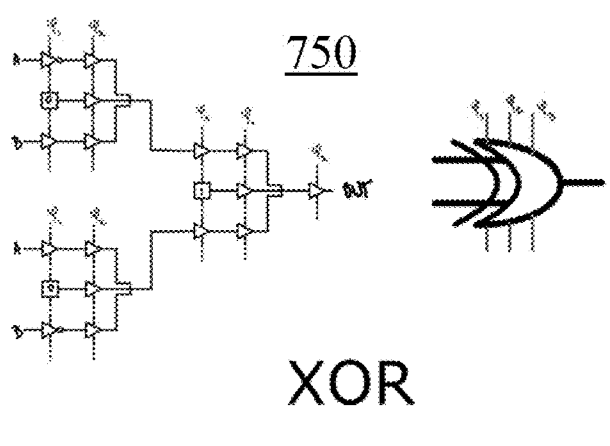

As seen in FIG. 7, each of the designs, except the XOR which is slightly more complicated, consists of two inputs paired with a predefined constant and passed through a majority gate to produce the proper logical output. Three-phase activation signals are designated by $\varphi_1$, $\varphi_2$, and $\varphi_3$ input and output lines. The constant cells have a slightly smaller output current, so an extra buffer firing on $\varphi_2$ is added to each of the majority gate input lines to makes sure that each value has an equal vote. Each AND 710, NAND 720, OR 730, and NOR gate 740 takes one full activation cycle to run.

The XOR gate 750 is a bit more complicated because it is made from two AND gates and an OR gate: XOR (A, B)=A*B+AB*. The XOR gate is therefore more expensive in power and area, and requires two full activation cycles to complete.

All of these logic gates expect input data to arrive on the first activation phase, $\varphi_1$. The simple gates (NAND, AND, OR, and NOR) will send their output on the following $\varphi_1$, and the XOR gate will output data on the second $\varphi_1$. A "phase synchronizer", which would allow data values to enter the circuit design on any activation phase, is therefore required to remove these design assumptions.

Phase synchronizer. AQFP logic requires precise alignment of phase-overlapping AC activation signals as a basis for data propagation. This inherent synchrony presents a practical barrier to scaling to large systems due to the accumulation of phase-skew across designs of moderate size and complexity as the wavelength of the clock becomes comparable to the length of some interconnect paths. This problem is well known in the CMOS and superconductor electronics (SCE) communities, and has been a subject of active research since the advent of clocked systems [R. Huff, K. Reinhard, and D. Upp, "The synchronizations of time division multiple access systems: an analytical and experimental study," Defense Technical Information Center, Tech. Rep., 1969; O. Dassa, "A new approach to easily resolve the hidden timing dangers of false path constraints on clock domain crossings," Design and Verification Conference Proceedings Archive, p. 8, 2022; R. Kuttappa, B. Taskin, S. Lerner, and V. Pano, "Resonant clock synchronization with active silicon interposer for multi-die systems," IEEE Transactions on Circuits and Systems I: Regular Papers, vol. 68, no. 4, pp. 1636-1645, 2021; G. Datta, Y. Lin, B. Zhang, and P. A. Beerel, "Metastability in superconducting single flux quantum (sfq) logic," IEEE Transactions on Circuits and Systems I: Regular Papers, vol. 68, no. 5, pp. 1990-2002, 2021; J. Egan, M. Nielsen, J. Strong, V. Talanov, E. Rudman, B. Song, Q. Herr, and A. Herr, "Synchronous chip-to-chip communication with a multi-chip resonator clock distribution network*," Superconductor Science and Technology, vol. 35, no. 10, p. 105010, September 2022.].

On the scale of single-chip designs, a phase synchronizer is highly desirable to allow resilience against the significant timing uncertainty in crosschip connections [C. L. Ayala, O. Chen, and N. Yoshikawa, "Aqfptx: Adiabatic quantumflux-parametron timing extraction tool," IEEE International Superconductive Electronics Conference (ISEC), pp. 1-3, 2019;]. On the scale of larger systems, unless synchronization recovery of data across unknown phases can be achieved, scaling to large multi-chip modules envisioned by system architects [R. N. Das, V. Bolkhovsky, A. Wynn, R. Rastogi, S. Zarr, D. Shapiro, M. Docanto, L. M. Johnson, and E. A. Dauler, "Waferscale s-mcm for high performance computing," IEEE 70th Electronic Components and Technology Conference (ECTC), pp. 582-588, 2020; Z. Fredin, J. Zemanek, C. Blackburn, E. Strand, A. Abdel-Rahman, P. Rowles, and N. Gershenfeld, "Discrete integrated circuit electronics (dice)," 2020 IEEE High Performance Extreme Computing Conference (HPEC), pp. 1-8, 2020] may be intractable.

AQFP technology is therefore not a natural pair for asynchronous circuits because of the required activation signal. The activation signal is also commonly referred to as the "clock signal", but is not called a "clock signal" herein, so that it does not get confused with the type of global clock signal required for synchronous computing logic. The three-phase activation signal needs to be locally ordered as $\Phi_1$, then $\Phi_2$, then $\Phi_3$, with sufficient overlap in order to properly pass bits; however, with the addition of a phase synchronizer and proper data token buffers, there is no requirement that the local phase of a logic cells needs to be aligned with neighboring cells. Therefore, global clock synchronization is completely avoided, which is an important requirement in order to avoid limitations in system scaling beyond the wavelength of a global clock.

Care must be taken to ensure that data values are properly passed between neighboring QFPs and are not dropped between clock phases. A phase synchronizer circuit according to one aspect of the invention provides a solution to this problem by removing timing uncertainty on an incoming data signal. This is achieved by sampling the input signal across all possible arrival phases and propagating the data value to a known phase of a subsequent activation cycle. A weak constant QFP cell is introduced to behave as a filter on the input signal to prevent random noise from being amplified by the synchronizer.

Weak constant QFP cell. A generic AQFP, schematic shown in FIG. 22A, consists of two superconducting loops 2205, 2210, each with a single Josephson junction 2215, 2220 that share a backbone and are inductively coupled 2225, 2230 to an AC activation signal 2240. When the activation signal is on, a single flux quantum will be stored in one of the two loops 2210, 2220, corresponding to a logical "1" or "0" state, directed by the polarity of the input current passing through each of the loops. A conventional AQFP buffer does not have a logically deterministic state for a null input condition; in the case of no current on the input line, it will amplify thermal noise and flux-bias offsets to generate pseudorandom data output [H. Ko and G. Lee, "Noise analysis of the quantum flux parametron," IEEE Transactions on Applied Superconductivity, vol. 2, no. 3, pp. 156-164, 1992]. This is an issue for a bit-level synchronizer which must sample the input across all phases and selectively propagate the meaningful data value. Therefore, to design a phase synchronizer, a weak-constant QFP cell was developed.

Figures 22A, 22B:
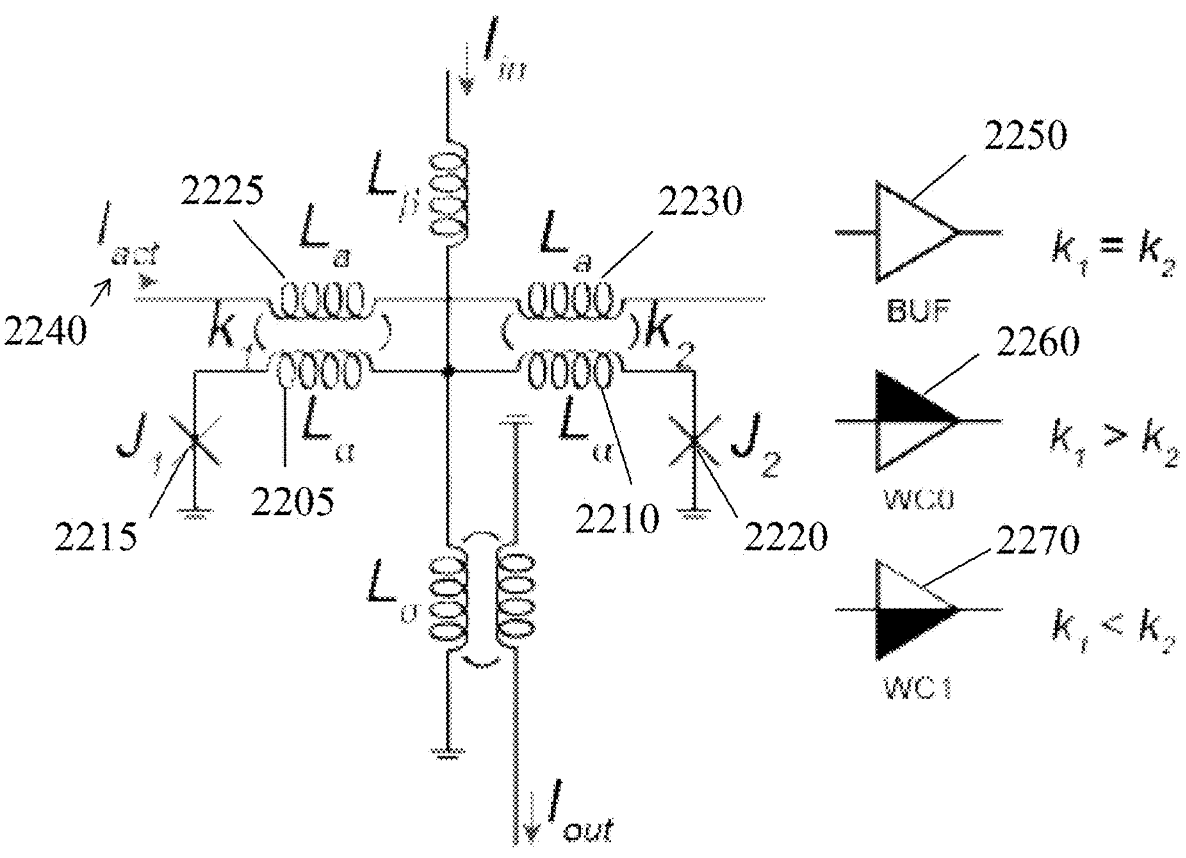
FIG. 22A is a schematic of a generic AQFP circuit and FIG. 22B depicts the circuit symbols for buffer (BUF), weak constant 0 (WC0), and weak constant 1 (WC1) as they relate to the schematic of FIG. 23A, according to one aspect of the invention.

In such a gate, a constant logic value will be given on the output if the signal on the input is null or weak, but in the presence of a data signal larger than a predetermined threshold, the constant output will be overwritten by the data bit. Shown in FIG. 22B, are circuit symbols for buffer (BUF) 2250, weak constant 0 (WC0) 2260, and weak constant 1 (WC1) 2270, and their associated relationship to the schematic. A buffer 2250 has perfectly symmetric coupled loops ($k_1=k_2$), while the weak constants 2260, 2270 have unequal coupling constants ($k_1>k_2$ or $k_1<k_2$). A weak constant is created by introducing a slight asymmetry between the activation coupling coefficients, leading the QFP to preferentially favor one state. The strength of this offset can be controlled by the magnitude of the asymmetry, while the default state of the weak constant QFP can be controlled by selecting which loop is larger.

This can be further understood by examining the current dynamics of the basic AQFP device. Writing Kirchoff's current Law on each of the nodes of the QFP results in the following three equations:

$$I_c \sin\phi_1 + \ell_\alpha(\phi_1 - \sigma - n_a k_1 \alpha) = 0 \tag{1}$$

$$\ell_\alpha(\phi_1 + \phi_2 - 2\sigma + n_a(k_s - k_1)\alpha) + \ell_\beta(\beta - \sigma) - \ell_\sigma \sigma = 0 \tag{2}$$

$$I_c \sin\phi_2 + \ell_\alpha(\phi_2 - \sigma + n_a k_2 \alpha) = 0 \tag{3}$$

where $I_c$ is the critical current of the junctions, $$\ell = \frac{\Phi_o}{2\pi}\frac{1}{L}$$

for each inductor, $\phi_1$ and $\phi_2$ are the phase differences across each junction, $\beta$, $\alpha$, and $\sigma$ are the phase differences across the input, loop, and output inductors, respectively, $n_a$ is the activation transformer ratio, which is assumed to always be symmetric in both loops, and $k_1$ and $k_2$ are the coupling constants which can vary. These equations can be reorganized to be expressed in terms of $\phi_+=½(\phi_1+\phi_2)$ and $\phi_-=½(\phi_1-\phi_2)$, and solve Eq. 2 for $\sigma$ to reduce the three equations to two and get the following result:

$$2I_c \sin\phi_+ \cos\phi_- + \ell_+\left(\phi_+ + \frac{n_a(k_2 - k_1)}{2}\alpha - \frac{\ell_\beta}{\ell_\ell(k_\sigma - 2)}\beta\right) = 0 \tag{4}$$

$$2I_c \cos\phi_+ \sin\phi_- + \ell_\ell(2\phi_- - n_a(k_2 + k_1)\alpha) = 0 \tag{5}$$

where $$\ell_+ = \frac{2\ell_\alpha(k_\sigma - 2)}{k_\sigma}$$

and $k_\sigma=(2\ell_\alpha+\ell_\beta+\ell_\sigma)/\ell_\alpha$. These equations guide the operation of the parametron.

The QFP will be storing information when it is in the double potential state, i.e. when the activation phase difference $$\alpha = \pm\frac{\pi}{n_a(k_2+k_1)}$$

[M. Hosoya, W. Hioe, J. Casas, R. Kamikawai, Y. Harada, Y. Wada, H. Nakane, R. Suda, and E. Goto, "Quantum flux parametron: a single quantum flux device for josephson supercomputer," IEEE Transactions on Applied Superconductivity, vol. 1, no. 2, pp. 77-89, 1991]. This corresponds to a solution for Eq. 5 when $\phi\_=\pm\pi$ and therefore the analysis can be reduced to Eq. 4 when $\phi_0$, $\pm\pi$.

Figure 23A:
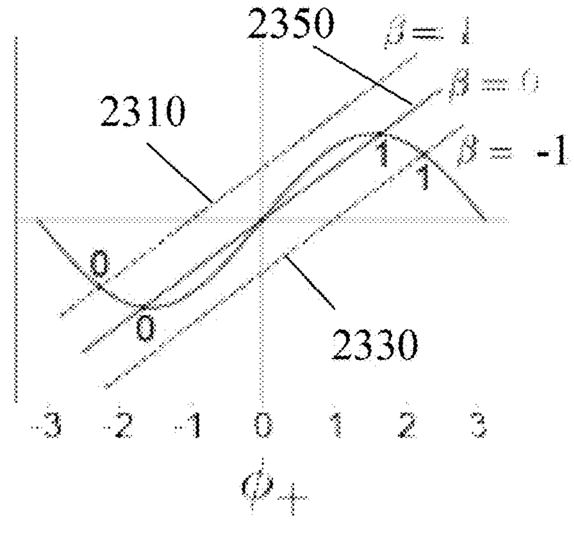
FIGS. 23A-B are graphs of the solutions to Eq. 4 for the buffer when $k_1=k_2$ (FIG. 23A) and the weak constant 0 when $k_1>k_2$ (FIG. 23B), according to one aspect of the invention.
Figure 23B:
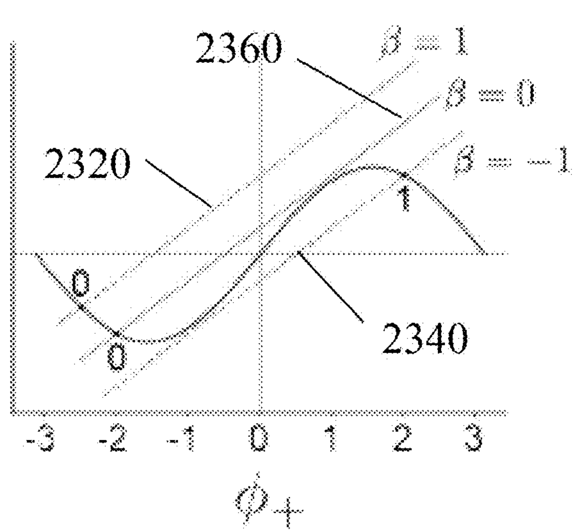

FIGS. 23A-B are graphs depicting solutions to Eq. 4 for the buffer when $k_1=k_2$ (FIG. 23A) and the weak constant 0 when $k_1>k_2$ (FIG. 23B). The logical value that each solution corresponds to is labeled on the graphs. Dashed lines above 2310, 2320 and below 2330, 2340 correspond to input 1 ($\beta=1$) and 0 ($\beta=-1$), respectively; and the solid line 2350, 2360 is state of the parametron when activated with no input ($\beta=0$). As shown in FIGS. 23A-B, the solution of Eq. 4 can be visualized as the intersection of a sine function with a straight line. Provided the slope, $\ell_+$, is less than one, there are up to three possible solutions: high or low $\phi_+$, corresponding to a logical 1 or 0, and the solution around 0, which corresponds to an energy maxima.

The state that the parametron settles on depends on the linear shift provided by the $\alpha$ and $\beta$ term in the line equation. If $k_1=k_2$, as is the case for the AQFP buffer, then the state of the gate depends entirely on the input value. If no input value is given, it will randomly slip into either high or low state. However, if the coupling constants are not equal, then the parametron state also depends on the activation signal, and it is this asymmetry that produces the biased weak constant cell. In other words, the extra coupling between the activation transformer behaves as a current source in one of the parametron loops and causes the output to favor one side.

Figure 24:
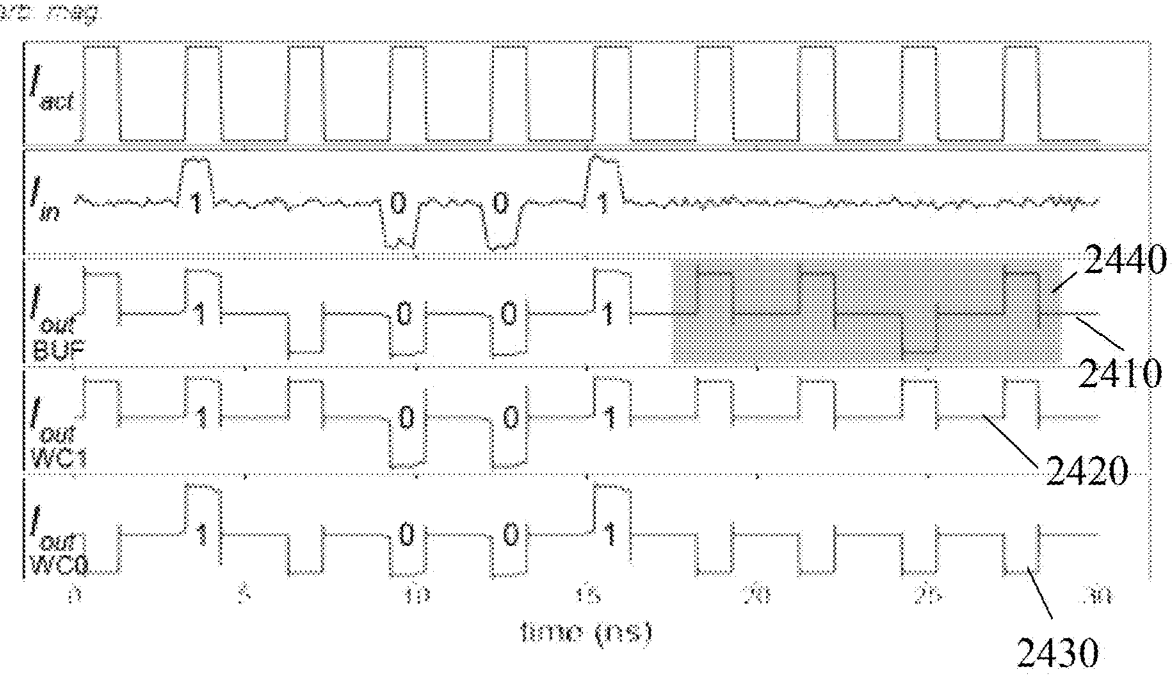
FIG. 24 depicts simulation output for a single buffer, weak constant 1 (WC1), and weak constant 0 (WC0).

FIG. 24 provides simulated verification of both weak constant cells and compares them to a conventional AQFP buffer. The SPICE level simulation was performed with Cadence SPECTRE simulator with support for Josephson junction dynamics. Shown in FIG. 24 is simulated output of a single buffer 2410, weak constant 1 (WC1) 2420, and weak constant 0 (WC0) 2430. A 1 μA Gaussian random noise source 2440 was included the input signal to highlight the distinction between the weak constant cells and the buffer: the buffer amplifies the pseudorandom noise when no data value is passed, while WC0 and WC1 default to 0 or 1, respectively, maintaining a constant output.

Figure 8:
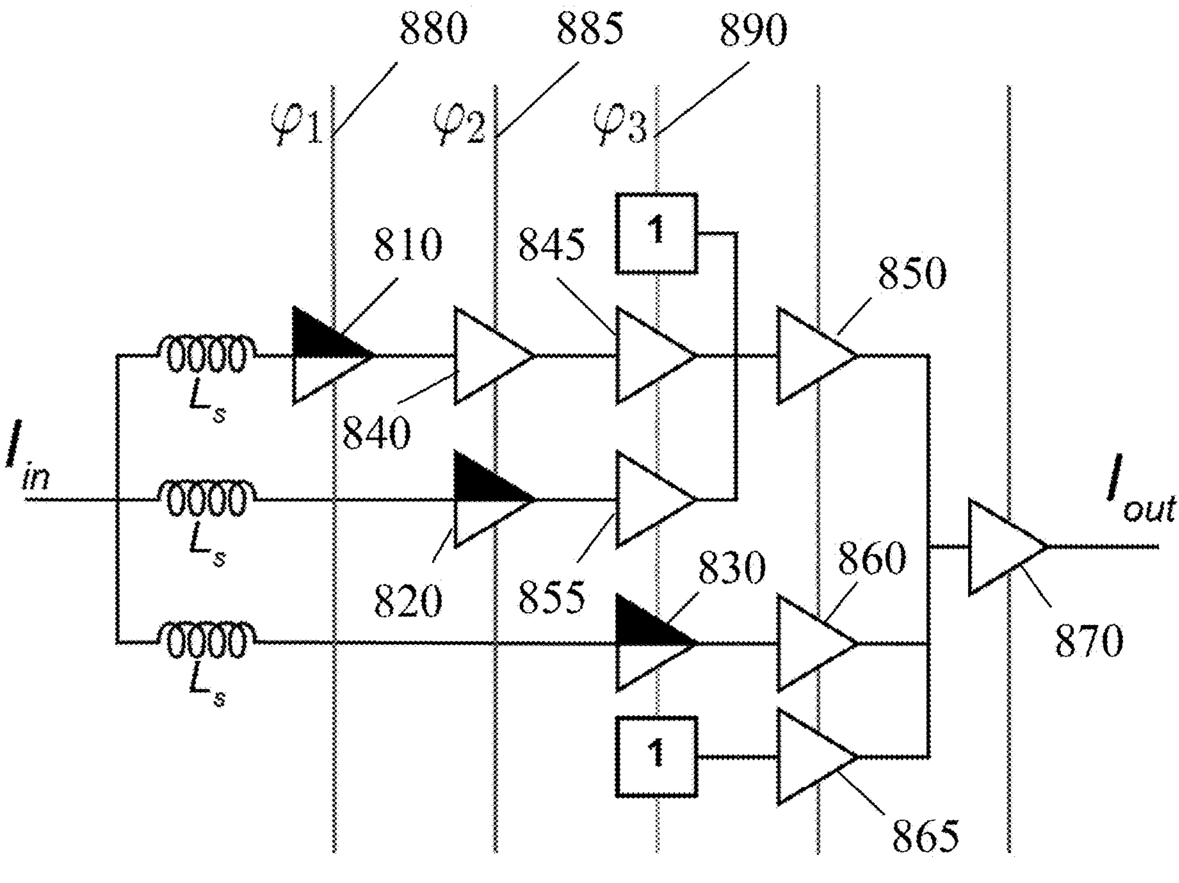
FIG. 8 is a schematic of an example embodiment of an AQFP data input phase synchronizer, according to one aspect of the invention.

Due to the two-terminal nature of the parametron device, AQFP logic requires a multi-phase activation signal with a minimum of 3 phases. In a circuit network, a single QFP device cycles through states of (i) receiving data while the activation signal is brought high, (ii) propagating data at the output/input while the activation signal remains high, and (iii) blocking data while the activation signal is low to prevent back propagation of data. Therefore, the arrival of data must align with a QFP in the receiving state. If the data arrival phase is unknown, then a bit-level phase synchronizer must perform the following tasks: accept data input during any time of the activation cycle (whether it aligns with a single phase or is spread between multiple), remove temporal uncertainty associated with the input bit by propagating the value to an output signal of a known phase, and output a predetermined value in the absence of an input signal FIG. 8 shows the schematic for a preferred embodiment of a phase synchronizer according to one aspect of the invention. To facilitate the activation phase agnostic data input, a phase synchronizer according to an aspect of the invention has a multiplexer topology that samples each input phase through a weak constant zero cell 810, 820, 830 and outputs the logical OR 840 of all input phases. It consists of an array of QFP buffers 840, 845, 950, 855, 860, 865, 870 that propagates an input signal on any activation phase to the first phase output of the next activation cycle. The circuit meets the phase synchronizer requirements for a three-phase clock, although the general design could be extended to a larger phase count if needed. In FIG. 8, majority operations are indicated by the connection of three nodes, thus a constant 1 joined with two inputs results in an OR operation. The activation signal for each cell is labeled with $\varphi_1$ 880, $\varphi_2$ 885, $\varphi_3$ 890 and cycles through each stage from left to right. Each QFP cell requires 2 JJs, the circuit has 24 JJs in total.

Figure 21A:
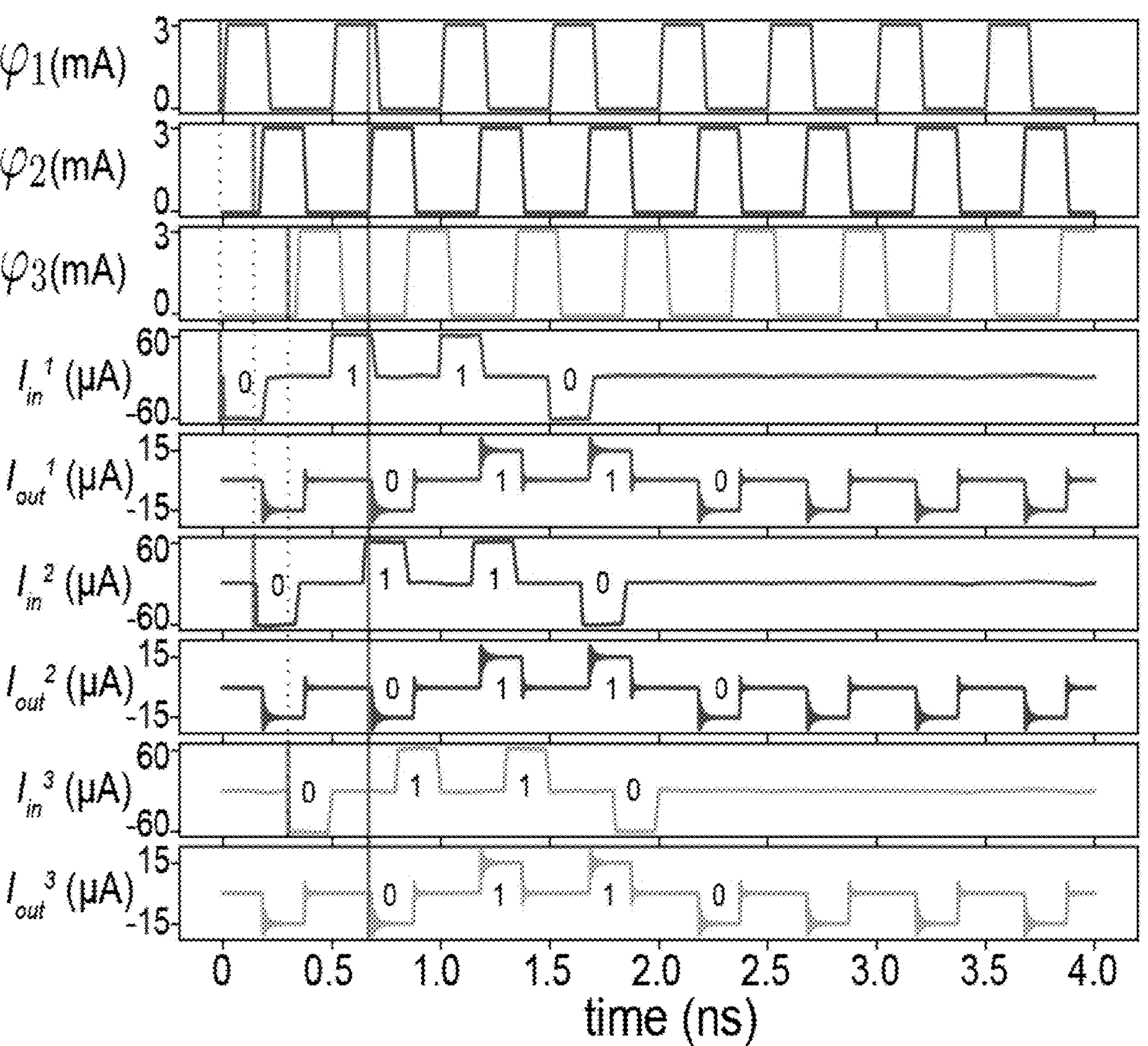
FIG. 21A depicts SPICE simulation output for the example phase synchronizer circuit of FIG. 8 at 1 GHz activation cycle.

Operation of the phase synchronizer was verified in simulation with Cadence SPECTRE tools, as shown in FIG. 21A, which depicts SPICE level simulation of the phase synchronizer circuit at 1 GHz activation cycle. The input was shifted to align with the first, second, and third phase, $I_{in1}$, $I_{in2}$, $I_{in3}$ respectively, while the output remains aligned at the second phase of the next activation cycle. A Gaussian noise source was included on the input signal.

Notably, the current input signal to the phase synchronizer must be large enough to split across all of the feedback inductors and overcome the threshold of the weak constant values. In simulation with 18 pH inductors on each of the input branches, a 60 μA input amplitude was required; compared to the 15 μA logic-level currents typically used in AQFP circuits. Therefore, to drive the phase synchronizer with AQFP logic, a multi-turn transformer could be added to the input to passively amplify the current. Alternatively, if area is more of a concern than energy, a DC-bias amplifier, such as a SQUID amplifier [K. Irwin and M. Huber, "Squid operational amplifier," IEEE Transactions on Applied Superconductivity, vol. 11, no. 1, pp. 1265-1270, 2001] or nanocryotron [A. N. McCaughan and K. K. Berggren, "A superconducting-nanowire three-terminal electrothermal device," Nano Letters, vol. 14, no. 10, pp. 5748-5753, 2014], could be added to the input. In large-scale system design, the phase synchronizer is an important circuit to include at I/O ports of AQFP logic units and could demand a higher current level as a design requirement; similar to I/O voltage levels versus logic voltage levels in CMOS IC design.

Figure 21B:
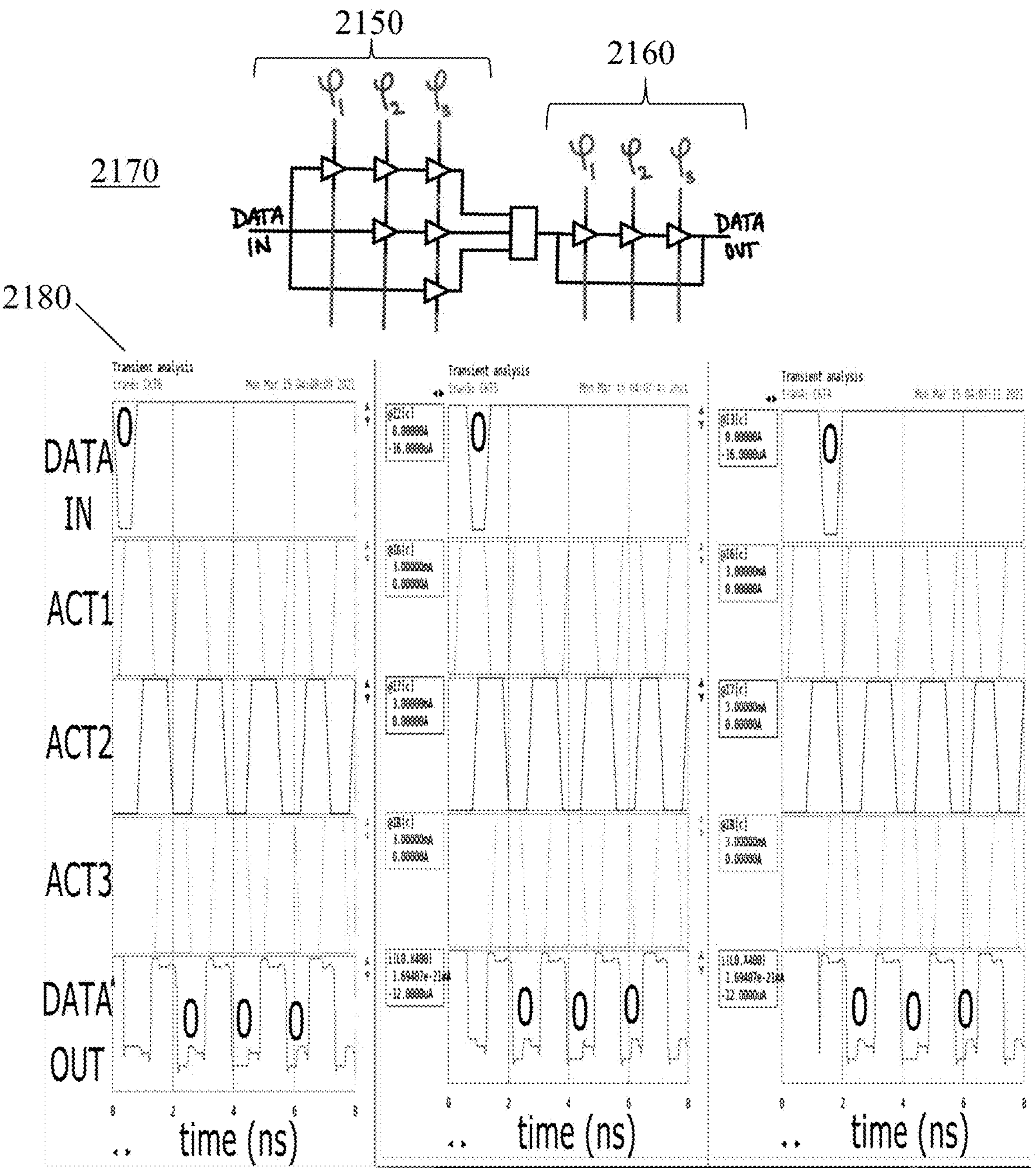
FIG. 21B depicts SPICE simulation output for an example embodiment of a phase synchronizer with a buffer ring oscillator attached to the output, according to one aspect of the invention.

FIG. 21B presents the SPICE simulation results for an alternate embodiment of a phase synchronizer 2150 with a buffer ring oscillator 2160 attached to the output, according to an aspect of the invention. The schematic 2170 is shown on the top and SPICE simulations 2180 for an input on each of the activation phases are shown below. A 0 signal is passed on the data line at different times and, regardless of activation phase, the 0 is repeated on the data output line after the first activation cycle. It is clear that no data are dropped, regardless of input phase. Input passed on activation phase 1, 2, and 3 and data out makes it to the buffer loop each time.

Figure 25A:
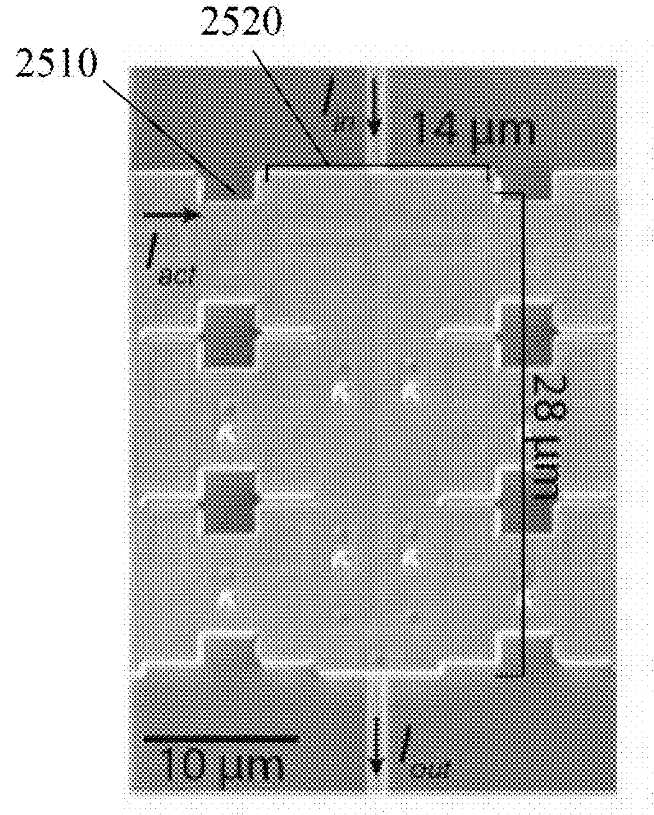
FIGS. 25A-B are polarized optical micrographs of the AQFP buffer (FIG. 25A) and the weak constant 0 (FIG. 25B).
Figure 25B:
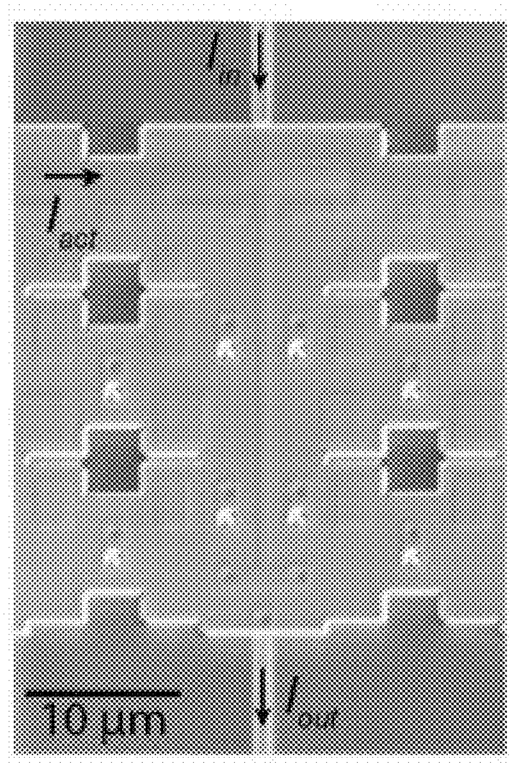

Fabrication and testing of the weak constant cell was performed. The circuits were fabricated using the SFQ5ee process [S. K. Tolpygo, V. Bolkhovsky, T. J. Weir, A. Wynn, D. E. Oates, L. M. Johnson, and M. A. Gouker, "Advanced fabrication processes for superconducting very large-scale integrated circuits," IEEE Transactions on Applied Superconductivity, vol. 26, no. 3, pp. 1-10, 2016], and tested with a liquid Helium dunk probe at kHz frequencies, using an Octopux measurement system [D. Zinoviev and Y. Polyakov, "Octopux: an advanced automated setup for testing superconductor circuits," IEEE Transactions on Applied Superconductivity, vol. 7, no. 2, pp. 3240-3243, 1997]. FIGS. 25A and B are polarized optical micrographs of the AQFP buffer (FIG. 25A) and the weak constant 0 (FIG. 25B). The asymmetry between the two loops of the QFP was introduced by briefly routing the activation line 2510 away from the right arm inductor of the QFP, therefore weakening the coupling constant of one loop. The activation signal is coupled through an inductor segment which is not pictured on the metal layer below, but outlined 2520 to highlight the asymmetry critical to the weak constant operation.

Figure 26A:
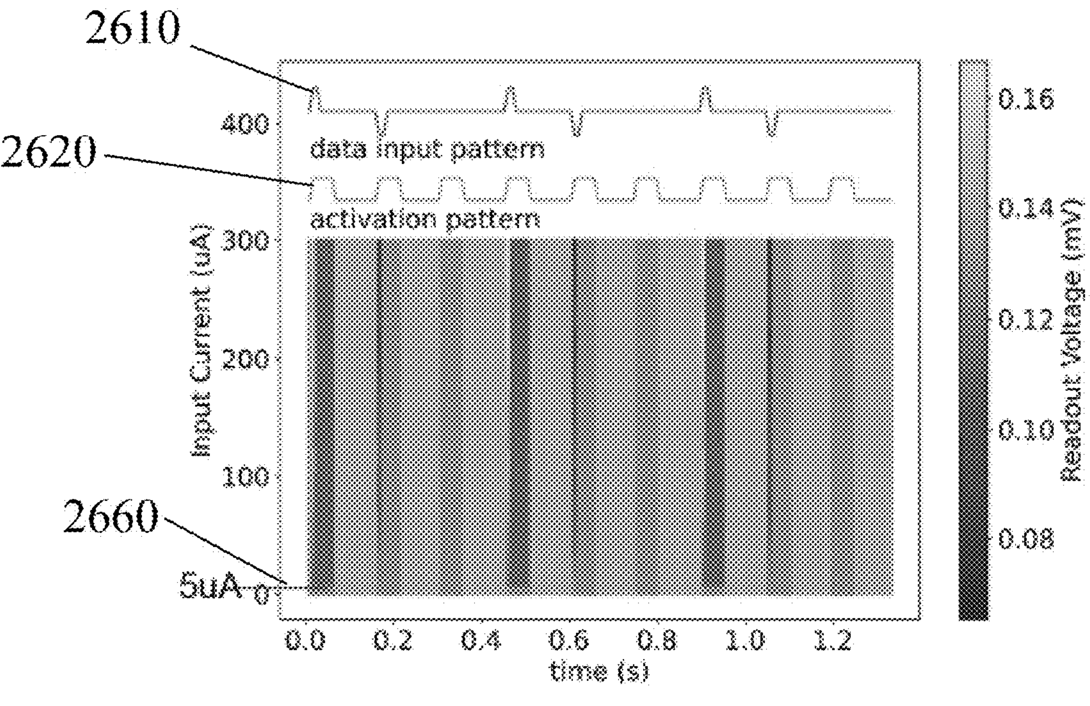
FIGS. 26A-B are graphs of input margin measurements for the AQFP buffer (FIG. 26A) and weak constant (FIG. 26B).
Figure 26B:
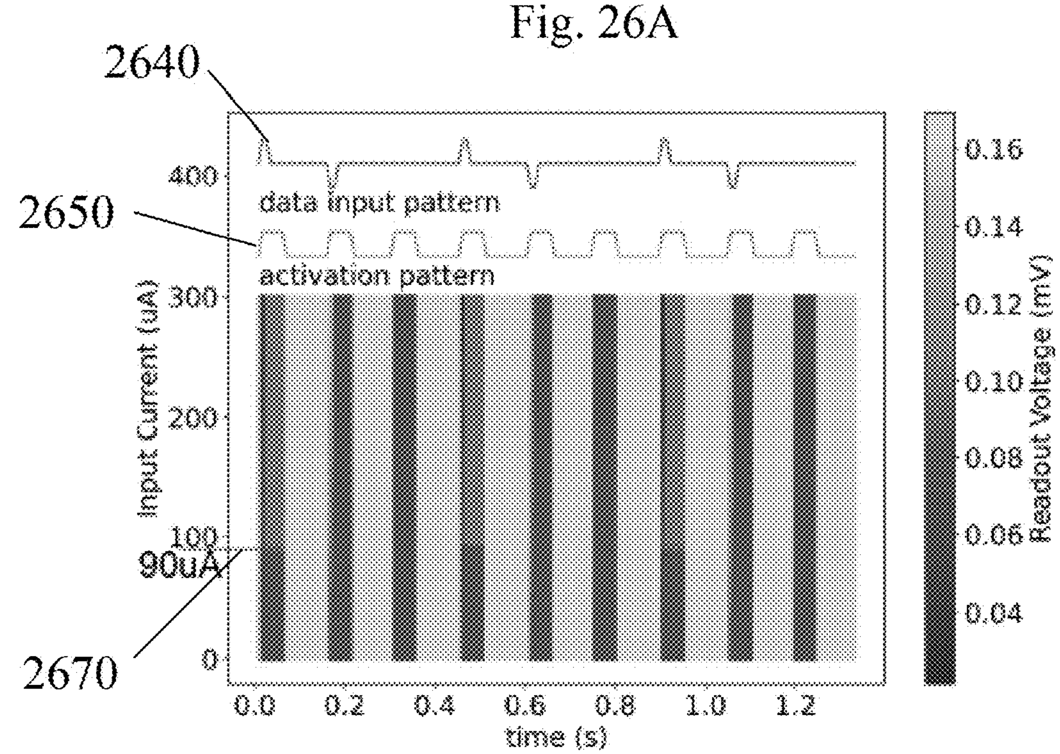

The output of the gates was measured by directly coupling a DC-bias SQUID to each of the output lines. The results from testing are shown in FIGS. 26A-B, which depict input margin measurements of the AQFP buffer (FIG. 26A) and weak constant (FIG. 26B). The data 2610, 2620 and activation 2630, 2640 patterns are shown across the top of each graph. As seen in FIGS. 26A-B, when the gate's data threshold is reached, the output voltage begins switching with the data pattern, which occurs at 5 μA 2660 for the buffer and 90 μA 2670 for the weak constant.

Ideally, it would be expected that the buffer to output pseudorandom values when activated with 0 μA on the input line; however, in reality, the gray zone of the buffer is not located perfectly at 0 μA due to flux trapping noise in the circuit and fabrication tolerances. In this sense, all buffer cells can indirectly behave as weak constants, but a weak constant is distinct in its purposeful asymmetric design and repeatable bias.

The data threshold for the fabricated buffer cell is around 5 μA, and 90 μA for the weak constant. Given that the current level used in AQFP logic is around 15-30 μA, the 90 μA threshold is generally too high of an operating point for the constant. This most likely arises from too large of an asymmetry between the activation couple constants.

There are at least two promising two applications for the phase synchronizer circuit: clock skew mitigation and asynchronous and temporal logic design. If it is known that data will arrive at some point during an activation cycle, the phase synchronizer can remove phase uncertainty by propagating the data value to a known phase of a future activation cycle. This can allow for wider clock margins at parts of the circuit which are highly sensitive to clock skew, such as long interconnects or unbalanced logic operations.

Additionally, the phase synchronizer can operate as a coincidence buffer by flagging the arrival of data across any amount of time because it will always output 0 until a data value 1 arrives. This is useful for (i) dual rail asynchronous logic or (ii) temporal race logic, where a bit is always represented with a high level value, and its value is determined by (i) the wire it is on or (ii) the time it arrives, respectively. Slight adjustments can be made to the design (replacing WC0 with WC1 and inverting the ORs), to have the synchronizer flag the presence of low current level data. This provides a first step to converting the multi-phase ac-biasing from a clock signal that is integral to the AQFP logic operation into a power grid with the logic operating more flexibly at an abstraction layer above it.

In order for sequential logic to execute properly in asynchronous circuits, some type of token passing or handshaking mechanism must be implemented between logic blocks in order to control the flow of information. Most commonly, traditional asynchronous logic design can be thought of as pipelines of functional blocks separated by buffers which control data flow. Nonlinear pipelines are similar in implementation, except they can have buffers with more than one input and/or output for forks or merges in the data path. The pipeline imposes flow control because at most one token can be stored along each channel and no tokens are lost, so data propagates along the structure relative to gate and wire delay [P. A. Beerel, R. O. Ozdag, and M. Ferretti, "A designer's guide to asynchronous VLSI", Cambridge University Press, 2010].

Token buffers can be described as being full buffers or half buffers. A full buffer can support distinct tokens on their input and output, while half buffers cannot. For example, in an N-stage FIFO (first in first out) linear pipeline with half buffers, there can be a maximum of N/2 tokens in the system. On the other hand, the same system made of full buffers would be able to hold N tokens.

In its purest form, ALA is a nonlinear asynchronous pipeline with full buffers embedded in each logic gate so that tokens are manipulated and propagated at every step. Better performance can be achieved when the synchronous functional blocks are expanded and the buffers are not as dense, because this decreases the token passing overhead. Regardless of how frequently the buffers are placed, they need to be capable of receiving a data input, passing that input to the logic block, and sending an acknowledgement signal when the block is ready for a new token. In order to not confuse these buffers with the QFP buffer or the ALA buffer gate, these are referred to herein as token buffers.

The design of the token buffer drives circuit power and area performance, because it determines the communication overhead required for tokens. Various token buffer implementations have different payoffs. Generally, the most robust token buffers make no assumptions about gate or wire delay, which makes them more resilient to noise and deviations in fabrication parameters. However, this robust design comes at the cost of power and area overhead. Token buffers that make assumptions about minimum and maximum gate delays are simpler and less expensive, but require stricter fabrication margins and design assumptions.

A common component in token buffers is the Muller C-element [D. E. Muller, "Theory of asynchronous circuit", University of Illinois, Digital Comput. Lab, Rep. 75, p. 78, 1966]. The C-element is a coincidence buffer, meaning that it keeps track of whether or not all of its inputs have arrived. It does this by updating its value only once A and B are equal, otherwise remaining in the previous state value. The C-element can be naively implemented with NAND logic gates and more optimally implemented with a single majority gate with a feedback loop. However, this majority gate implementation is difficult to time and properly verify in simulation design. There is also an asymmetric C-element, which has extra inputs that trigger a switch in the C-element depending on the direction of data, i.e. low to high vs high to low. The input with a plus (minus) symbol needs to be high (low) for the C-element to change from 0 to 1 (1 to 0). These C-element implementations used previously are not suitable for AQFP logic gates, however, because they do not account for the activation phase timing corrections.

Figure 9:
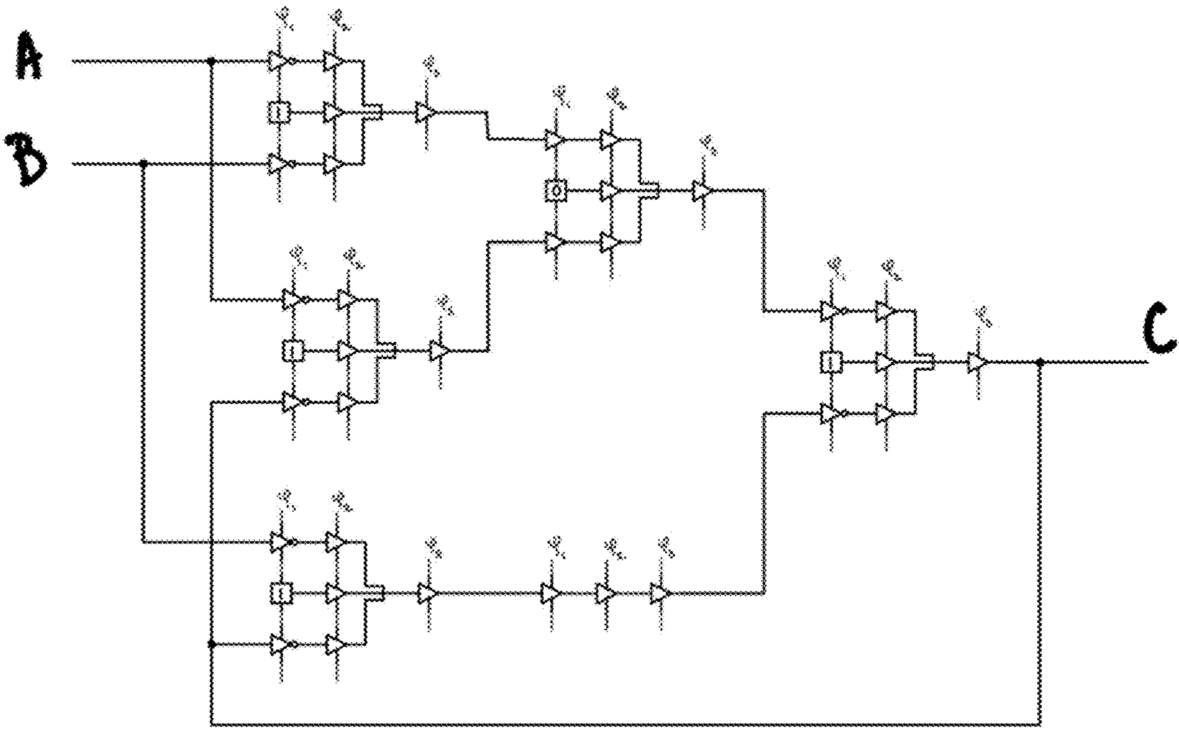
FIG. 9 depicts an example embodiment of a QFP-level schematic for a C-element, according to one aspect of the invention.

FIG. 9 depicts a QFP-level schematic for a QFP implementation of a C-element, where QFP buffers are added throughout the circuit to make sure that data are not dropped. The phase synchronizer array may also be added to each of the inputs if needed; however, this was not done because the C-element alone is not a token buffer because it does not incorporate feedback from neighboring gates or have an acknowledgement signal. The QFP C-element was instead employed as a building block for a Precharge Full Buffer (PCFB), shown in FIG. 11.

Figure 10:
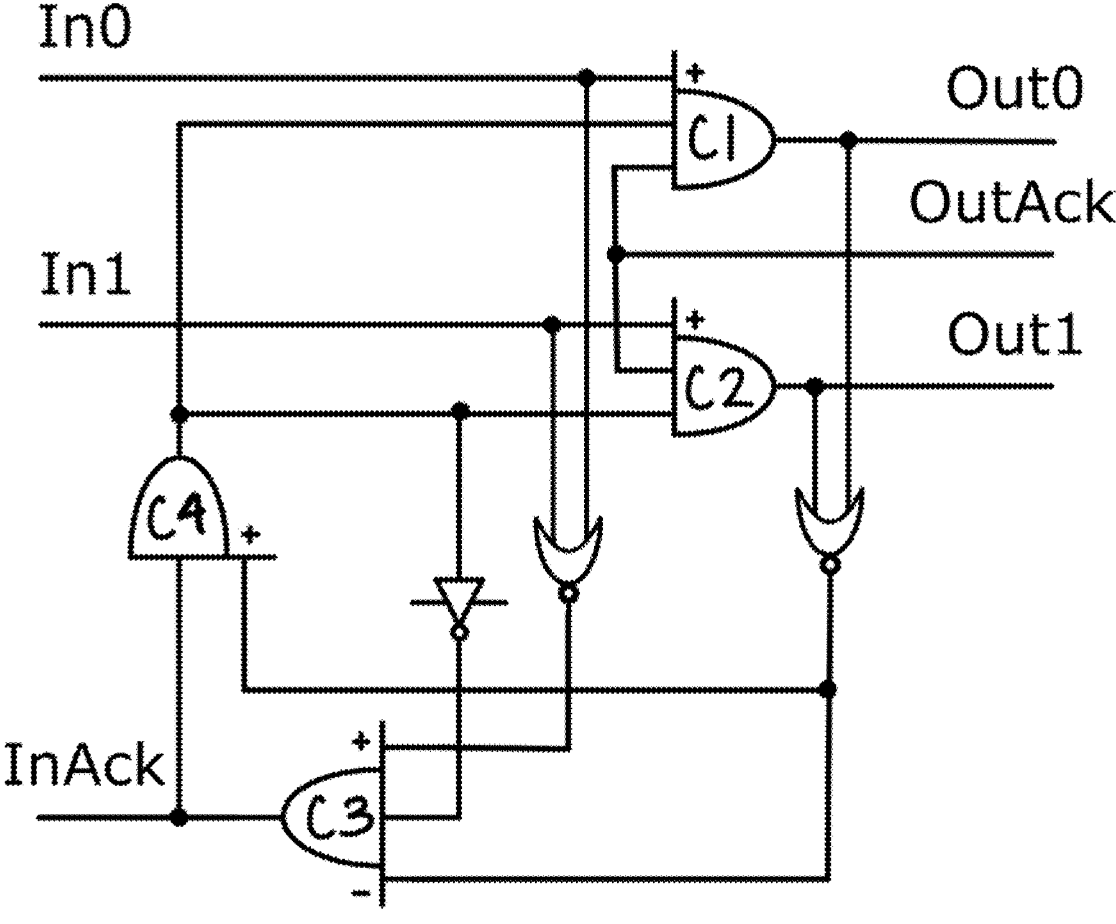
FIG. 10 is a logic-level schematic of an example of a prior art token passing mechanism for a Precharge Full Buffer (PCFB) implemented with QFP logic cells, according to one aspect of the invention.

In one embodiment, a Precharge Full Buffer (PCFB) according to the invention is a token buffer implemented with QFP logic cells. FIG. 10 is a logic-level schematic of an example prior art token passing mechanism. In FIG. 10, the token passing mechanism starts with all data lines low and ack lines high. When a signal comes in on the In0/In1 wires, it triggers C1/C2 to switch from 0 to 1. This brings C3, and therefore InAck, low via the NOR gate on the outputs. Pulling InAck low resets the data input values because it is linked to the OutAck signal in the left-hand environment. Once the data is reset, InAck pulls back high via the NOR output on the input signals. Similarly, the output signals are reset by OutAck once the data pulls the InAck signal low in the right-hand environment. One buffer is needed for each single-bit data input to each functional block. Modifications may be made to the design to allow for two inputs, such as what is needed for the AND, NAND, and OR gates, but an alternate token buffer was employed for the preferred embodiment.

Figure 11:
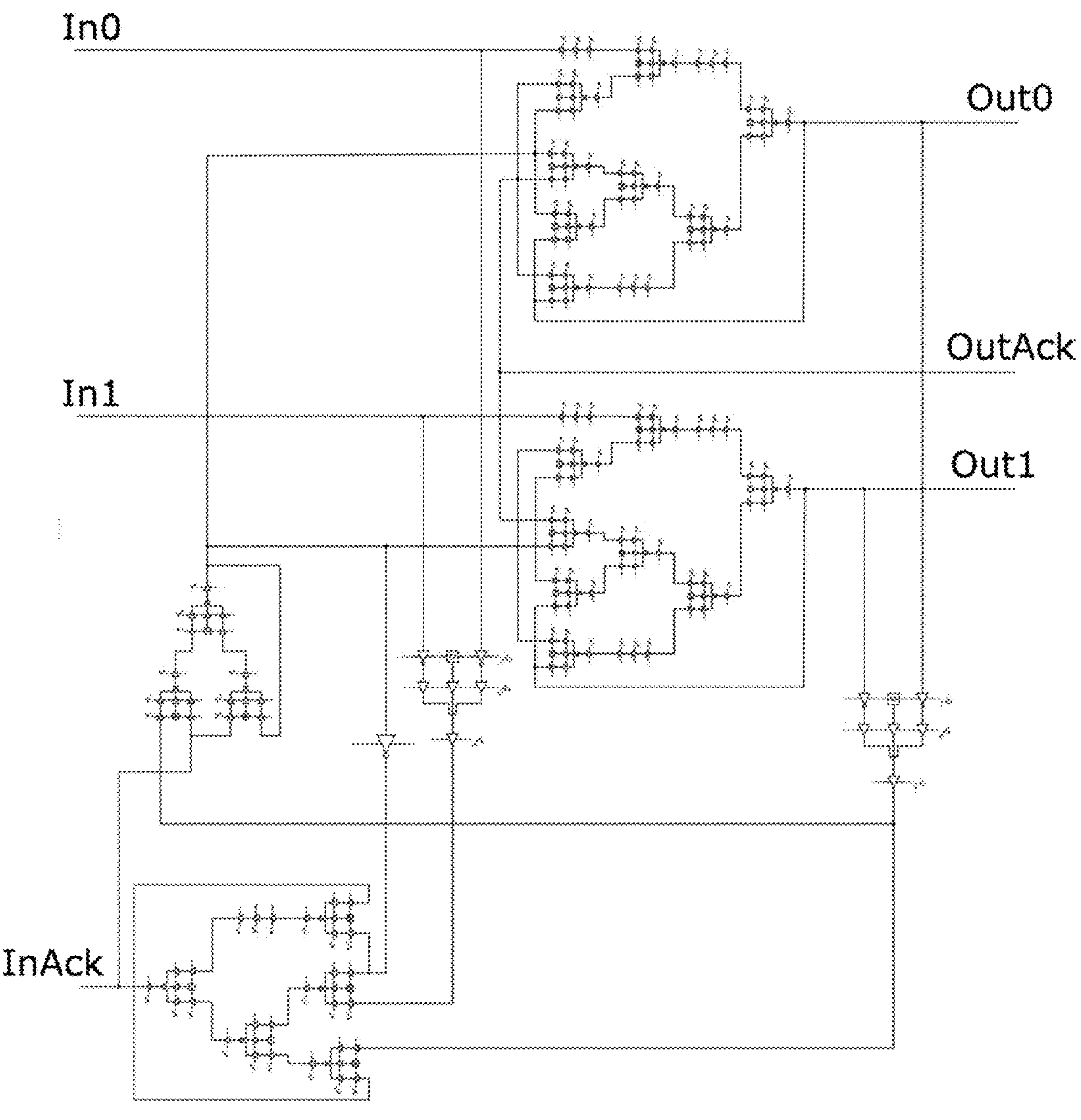
FIG. 11 is an example embodiment of a QFP-level implementation of a PCFB, according to one aspect of the invention.

A QFP-level implementation for a PCFB according to this aspect of the invention is shown in FIG. 11. The design is very area and power expensive. Furthermore, all of the AQFP logic gates expect binary encoded data, meaning that a single data line passes high and low values, so a conversion element needs to be added between the dual rail encoded tokens from the PCFB and the AQFP logic gates. The PCFB expects input on activation phase 1, so each functional logic gate cell must output values on phase 3. This can be a simple thing to keep track of for small functional blocks, but for more complicated blocks, the buffer array synchronizer may be added before each input so that values on each activation cycle can arrive regardless of phase.

QFP Full Binary Buffer (QFBB). The PCFB concept was designed for CMOS technology, and although the basic logic can be recreated in AQFP technology, it is not a very efficient way of passing tokens. Furthermore, the dual rail encoded token passing that is most commonly used in asynchronous pipelines, is not a good match for the majority-gate logic cells designed in AQFP. Therefore, the present invention incudes a more resource-efficient design, the QFP Full Binary Buffer (QFBB), shown in FIG. 12.

Figure 12:
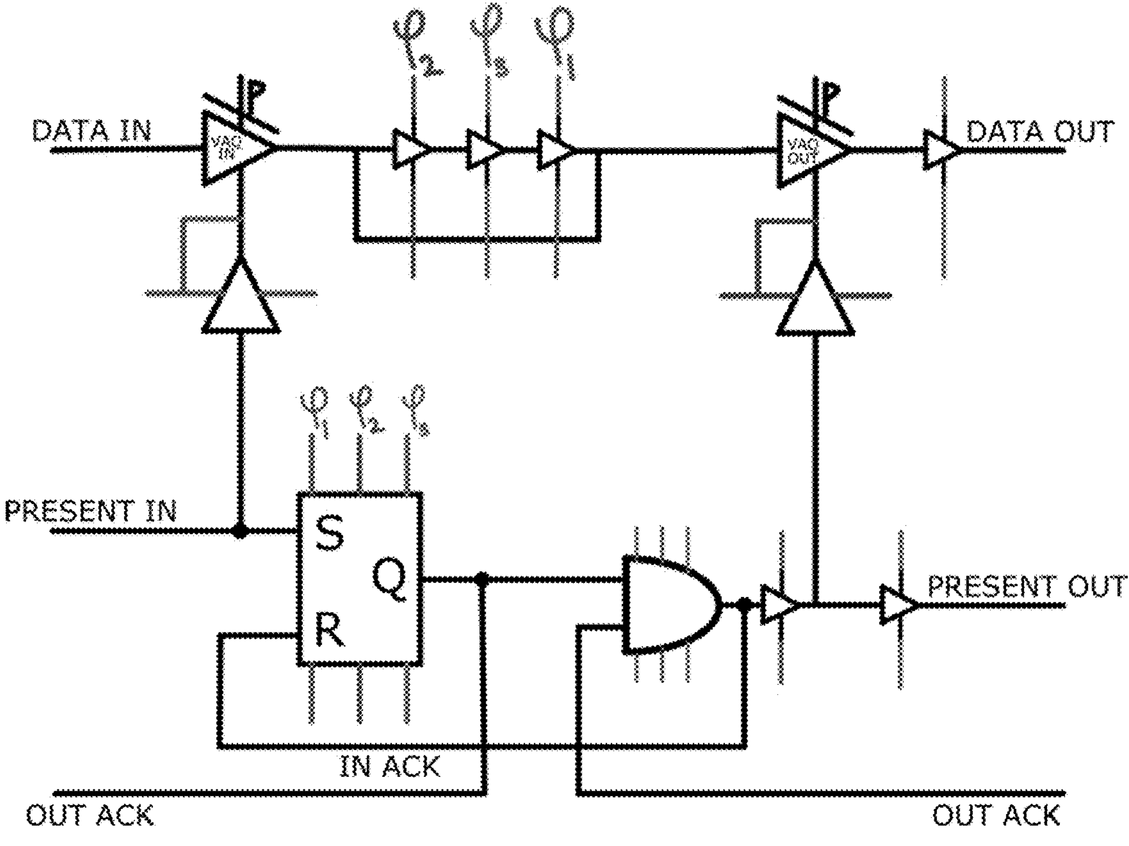
FIG. 12 is an example embodiment of a QFP Full Binary Buffer (QFBB) for single data input, according to one aspect of the invention.
Figure 13:
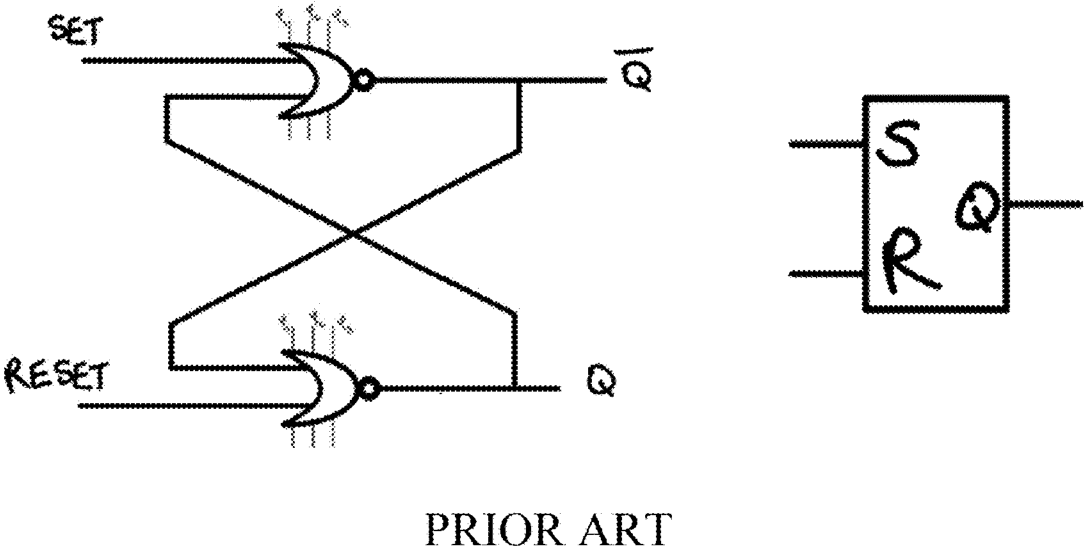
FIG. 13 is an example of a prior art QFP NOR flip-flop, according to one aspect of the invention.

As seen in FIG. 12, binary-encoded asynchronous data means that one wire has the data value (0/low and 1/high), while the other wire indicates present/high or null/low, and the value line is only valid when the present line is high. Regardless of one vs two inputs, the data value arrives at the QFBB with a present signal and is stored in a buffer loop, while the present signal is stored in a NOR gate flip-flop until it is either propagated by an output acknowledgment signal or reset by an input acknowledgment signal. For reference, the prior art NOR flip-flop is shown in FIG. 13.

The communication and coordination between the data value and present signal is where the QFP-specific mechanism comes into play. QFPs are two-terminal devices with two symmetric input signals. QFPs have been described so far as only being activated by an external ac-signal, however the QFP may also be a logic device on its own if the output from one QFP provides the activation signal to another. This is the heart of the QFBB: the present signal triggers a driving QFP that activates a variable activation QFP so that the data value can be stored into the buffer loop or propagated to the function block input. As in the PCFB, it is assumed that the data input always arrives on phase 1 and that the functional element also expects input on phase 1. As previously described, this can also be generalized by adding the phase synchronizer.

The single input QFBB design (FIG. 12) is useful for a strict implementation of ALA, meaning that bit-level token-passing around gate-level cells is used, because flow control around the single input buffer and inverter cells is needed. It operates as follows: when no tokens are present, both acknowledgment signals are low. When data arrives with the present signal high, VAQ IN is triggered so that the data value is propagated to the ring oscillator, where it is stored across activation cycles. The high present signal is then also stored across activation cycles in the flip-flop. If OUT ACK is low, indicating that there is no token blocking the next cell block, then the present signal passes the AND gate. This triggers VAQ OUT so that the value in the ring oscillator can propagate to the function block. The present signal is also passed to the function block, and it must be propagated with every activation phase that occurs inside the function in order to stay properly paired with the output bit to trigger the next token presence. A high output from the AND gate also resets the IN ACK signal with the flip-flop, so that an incoming token from the left-hand environment can arrive and the signal flows.

Figure 14:
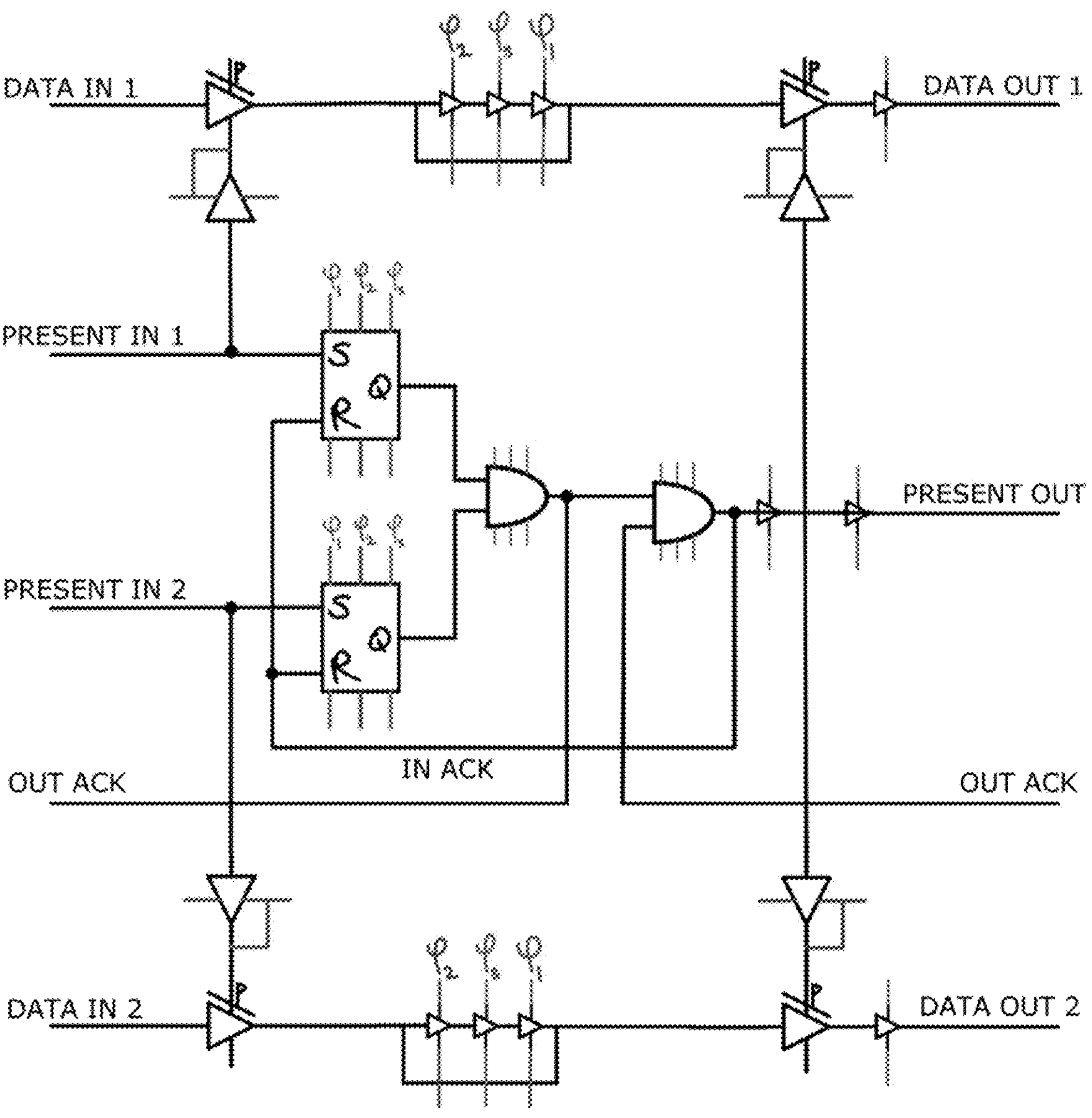
FIG. 14 is an example embodiment of a QFP Full Binary Buffer (QFBB) for two-data input, according to one aspect of the invention.

The two-input design, shown in FIG. 14, is very similar, but it blends a coincidence buffer with the token flow so that functional blocks are only initiated when both inputs are present. This is done by adding an AND gate between the two present signals, which must be high before triggering VAQ OUT. The two-input design tends to be more useful for wrapping logic gates or larger math modules.

Figure 15:
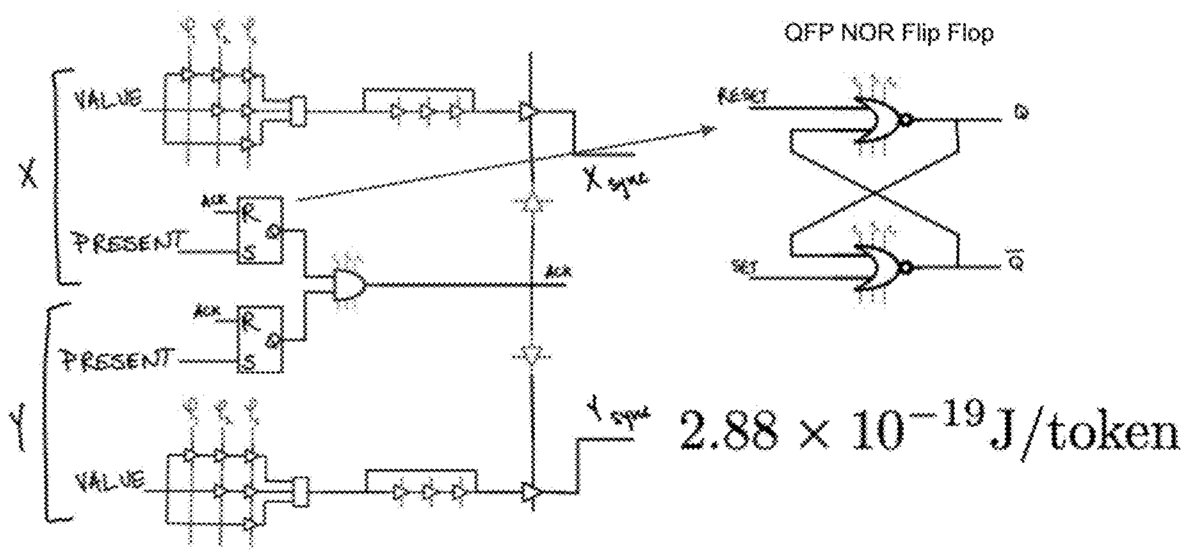
FIG. 15 depicts an example embodiment of a binary-encoded token passing mechanism, optimized for QFP logic, according to one aspect of the invention.

FIG. 15 is a schematic of a binary-encoded token passing mechanism, optimized for QFP logic, according to one aspect of the invention. Binary-encoded asynchronous data means that one wire encodes data with its value (0/low and 1/high) while the other wire indicates present/high or null/low. The value line is only checked when the present line is high. This design blends a coincidence buffer with the token passing, so that the data is only passed when two inputs are present. This is helpful for wrapping the synchronous adder and larger math modules, which will require two synchronized inputs.

The data values come in on whatever clock phase they want and are caught by the phase synchronizer buffer array, then stored in a buffer loop. Because different inputs could come in on different clock cycles, the present/absent signal must be stored across cycles, until both X and Y are there, when it must then be reset with an acknowledgment (ack) signal. This can be done with a QFP flip-flop cell made out of NOR gates. The presence of a value will be stored in each flip-flop, and once both are 1, the AND gate will flip high.

The communication and coordination between the present and value lines is where the QFP-specific mechanism is utilized. The output from the AND gate goes high and then triggers a special high gain QFP buffer (drawn in purple), which serves as the clock signal for the gating buffer outside of the ring on the value line. Without a clock signal, this final buffer will never fire, so the data value will be dropped after the buffer ring. Once the AND fires high with output on phase 3, the high gain QFP will fire on phase 1, causing both gating buffers on the value line to finally pick up the value from the buffer ring and propagate it to the synchronous modules. There may need to be another buffer added to the buffer loop for the phase timing to work out, but if a buffer output can be used as the clock signal for a different buffer, then the general design should work. In some embodiments, this “high gain QFP” with a “gating buffer” trick may be employed The energy loss for this token passing mechanism is estimated to be an order of magnitude better than the previous dual rail precharge full buffer, which is significant when determining how small to make the synchronous blocks due to their token passing overhead.

The concept of a QFP activated by another QFP was previously proposed as a variable activation QFP (VAQ) by Hioe, Hosoya, and Goto [W. Hioe, M. Hosoya, and E. Goto, "A new quantum flux parametron logic gate with large input margin", IEEE Transactions on Magnetics, vol. 27, no. 2, pp. 2765-2768, 1991]. It is the building block for their D-gate design, which generates combinatorial logic from networks of QFPs without the majority-gate wire logic. The output of one QFP does not have a strong enough output current on its own to drive another similar QFP. This can be solved by adding a "puller" to the VAQ QFP [W. Hioe, "Quantum Flux Parametron: A Single Quantum Flux Superconducting Logic Device", Vol. 2, World Scientific, 1991].

Figure 16:
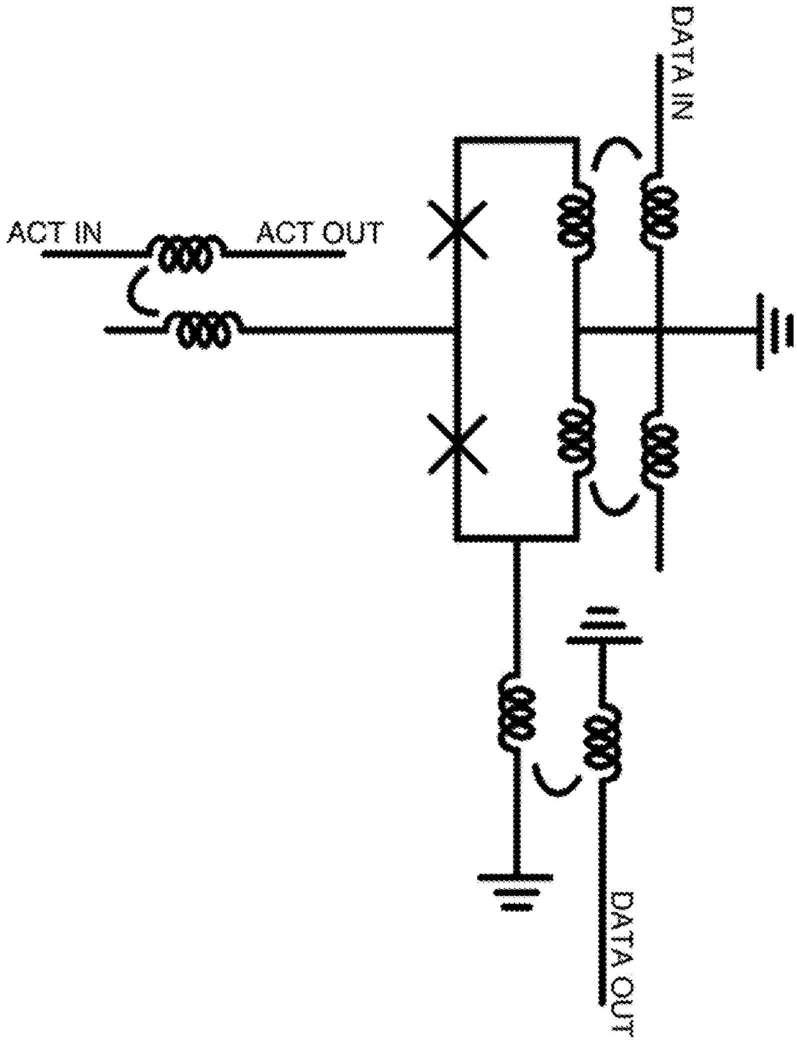
FIG. 16 is an example prior art I/O transformer QFP, as used in some embodiments of the invention.

A puller is a QFP attached in series to the activation line of another QFP (in this case, the variable activation QFP). A puller needs to be added to the I/O transformer QFP, as shown in FIG. 16, which is a different schematic/layout but has the same theoretical operation as the QFP buffer from FIG. 2. The original QFP can be specified as an "activation transformer" QFP, because the activation signal is applied through coupled inductors and the I/O signal is a current wire input. The "I/O transformer" is reversed, so that the I/O signal is applied to both junctions through the transformer and the activation signal is on a line; therefore, the puller can be added in series.

Figure 17:
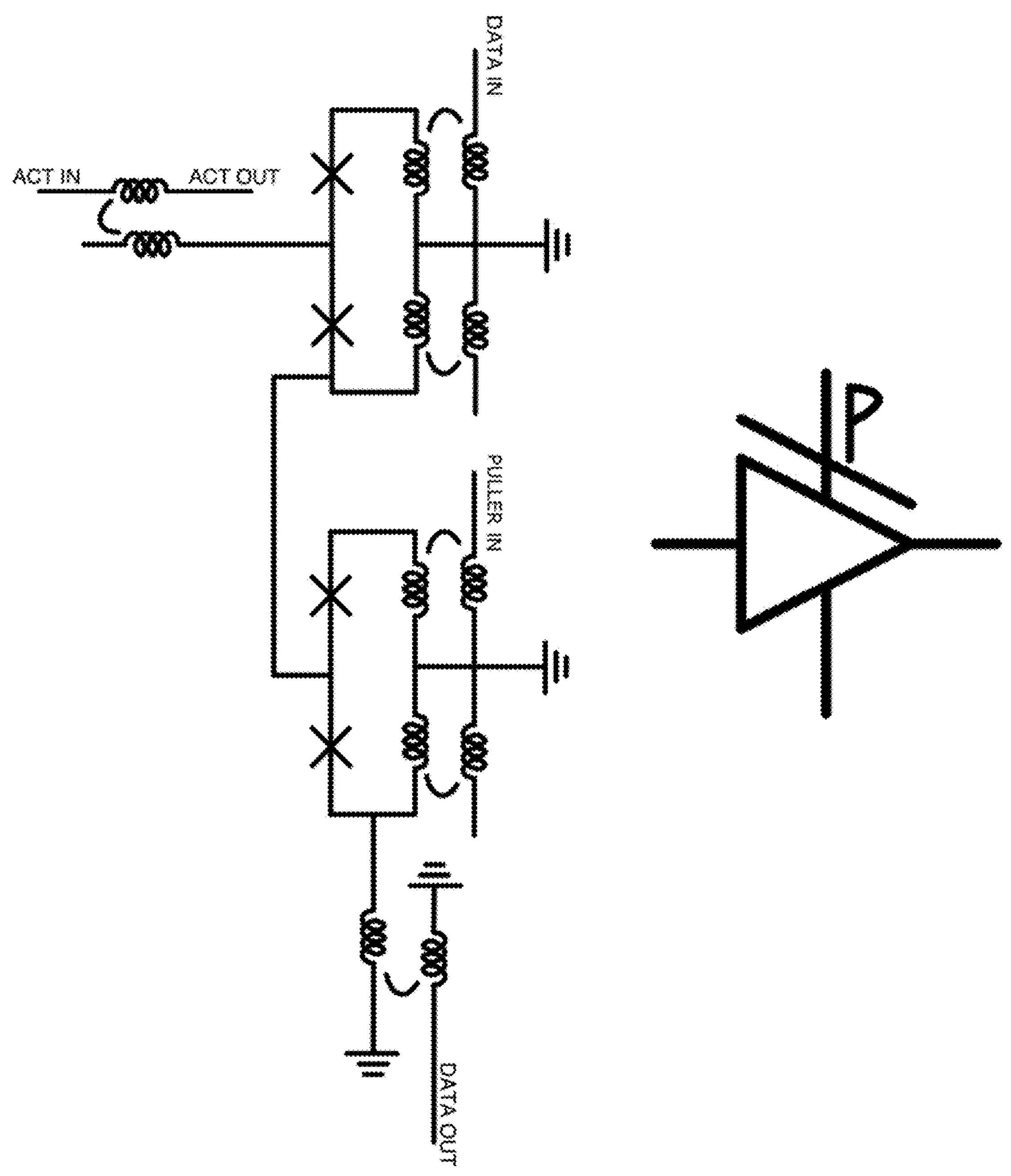
FIG. 17 is example prior art QFP with puller for activation signal boost.

The puller is biased by $\pi$ with its own input transformer. When it is placed between the QFP and an activation transformer, as shown in FIG. 17, the puller will provide a current boost to the activation signal, $\alpha$, so that the QFP can still fire even though it receives a smaller activation. More details on the I/O transformer QFP and puller operation can be found in Hioe [W. Hioe, "Quantum Flux Parametron: A Single Quantum Flux Superconducting Logic Device", Vol. 2, World Scientific, 1991].

Figure 18:
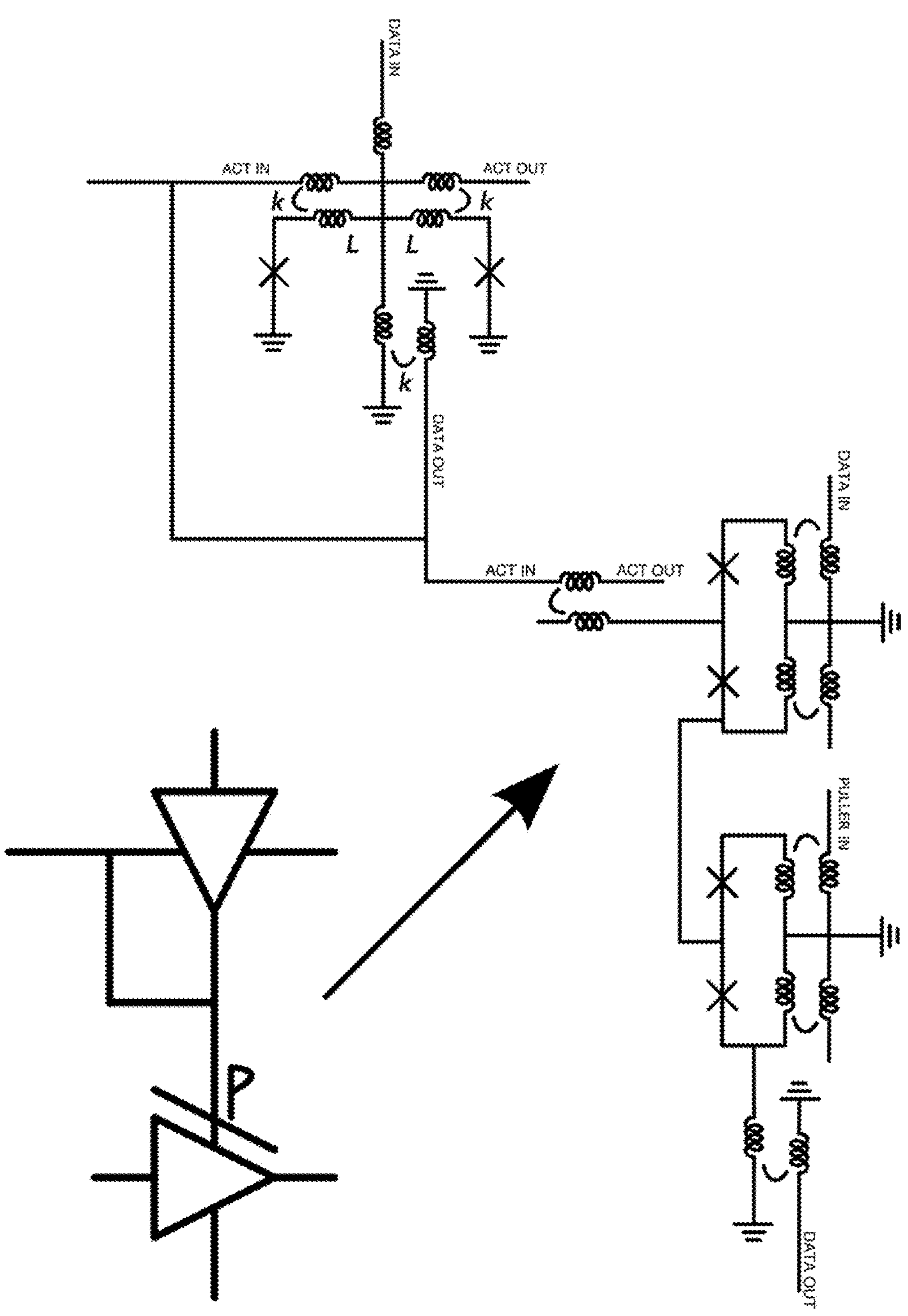
FIG. 18 depicts a junction-level schematic of a prior art Variable Activation QFP with Driving QFP.

For the driving QFP, the typical output flux angle of a QFP is around 120 degrees (it depends on $\beta$), and the VAQ needs an activation signal of at least if to fire. Therefore, the driving QFP output can be paired with the usual ac activation signal, so that the VAQ is fired whenever the driving QFP output is the same polarity as its activation signal. In the present invention, only a VAQ triggered by a high value is needed, which matches the polarity of the ac activation signal already in use, but in theory a low-triggered VAQ would also be suitable. A junction-level schematic diagram of the VAQ and the driving QFP along is shown in FIG. 18.

Figure 19:
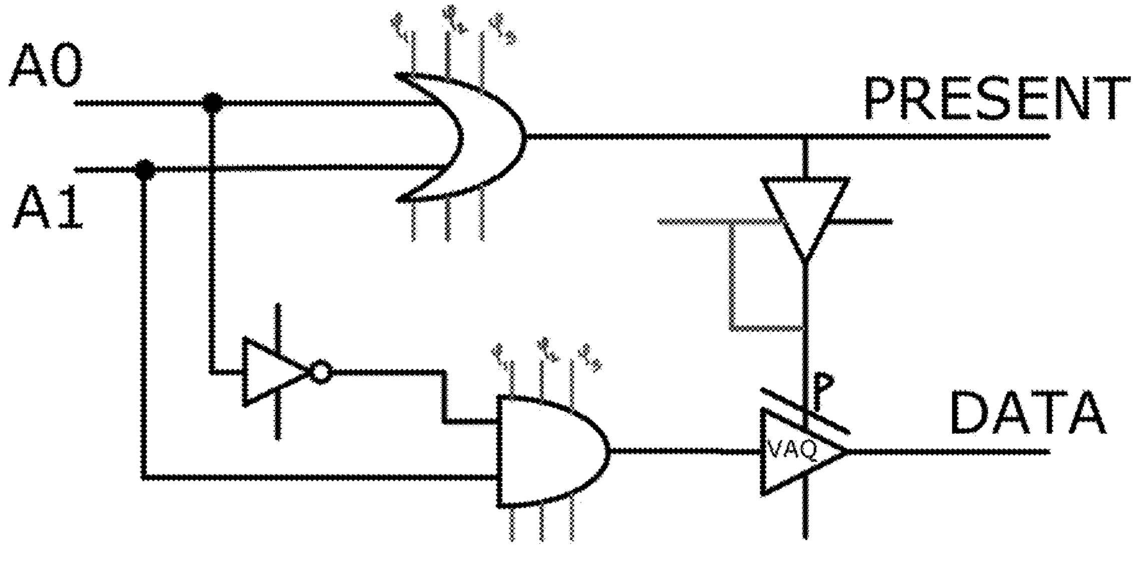
FIG. 19 depicts an example embodiment of a dual-rail to binary token converter circuit, according to one aspect of the invention.

The VAQ is also the element needed to convert between dual rail encoding and binary encoding of asynchronous data lines. This is because there needs to be some way to have if/then logic between the present and value line. An example of a dual rail to binary encoding converter is shown in FIG. 19. Again, the data value is stored in a buffer ring oscillator, and only propagated forward with a paired present signal when the VAQ fires.

Although high temperature superconductors are promising for the future of superconductivity, they are not yet relevant for superconducting circuits because tunneling junctions exhibiting the Josephson effect are not mature enough to be stable switching devices in HTS. Therefore, the present work focused on LTS, and all proposed chip designs require cryogenic cooling to operate properly.

SPICE simulation logic verification. Superconducting circuit schematics were simulated using WRSPICE [S. R. Whiteley, "WRspice Reference Manual", Whiteley Research Inc., Sunnyvale, CA, 4.3.13 ed., January 2021], an open source integrated circuit simulation tool which includes Josephson junction models. The default WRSPICE Josephson junction model is based on the RSCJ equivalent circuit, however other models can also be loaded and customized, which may be useful for future custom QFP development.

Figure 20A:
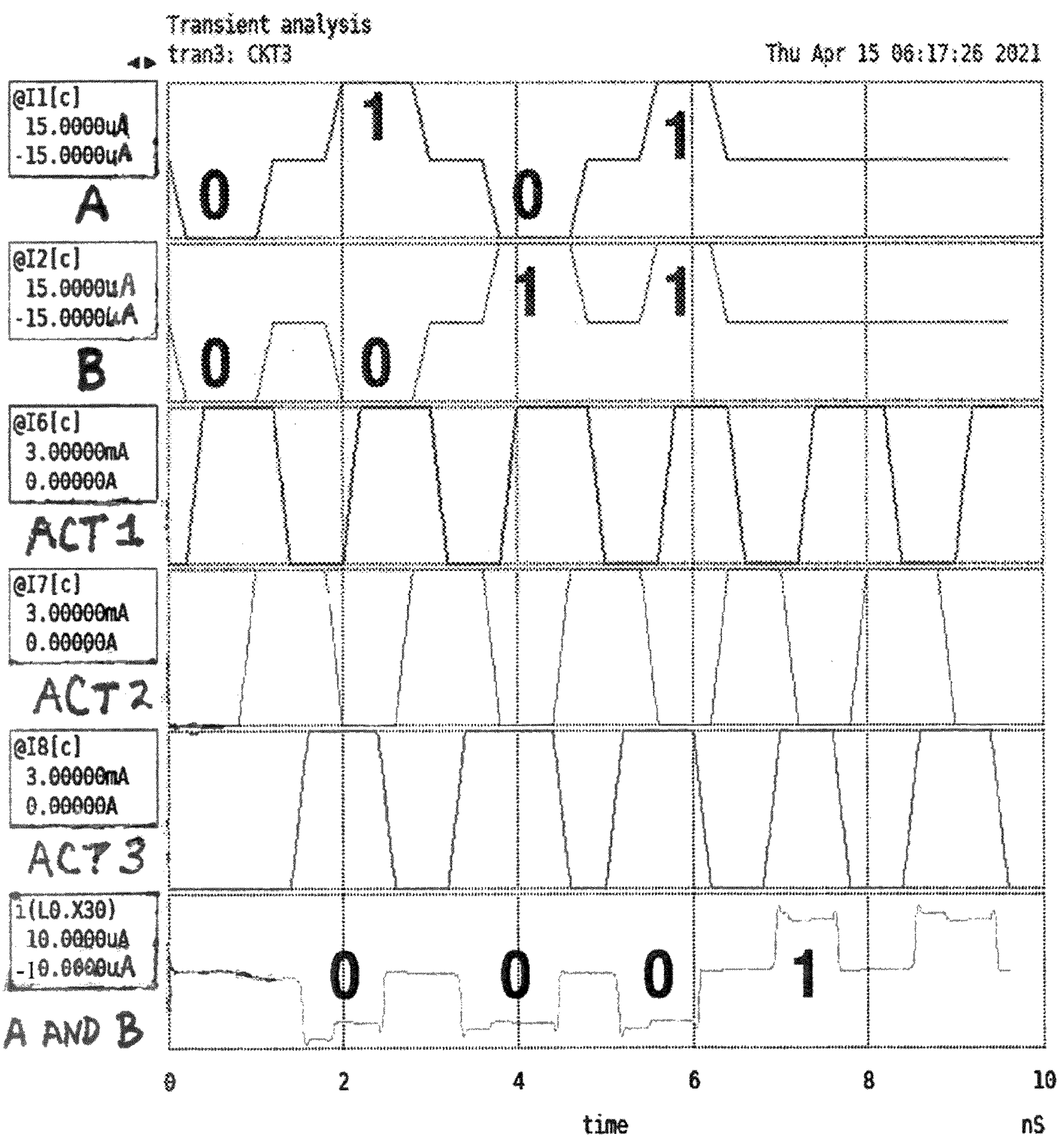
FIGS. 20A-C depict SPICE simulation output for example prior art AND, OR, and XOR AQFP logic gates, respectively.
Figure 20B:
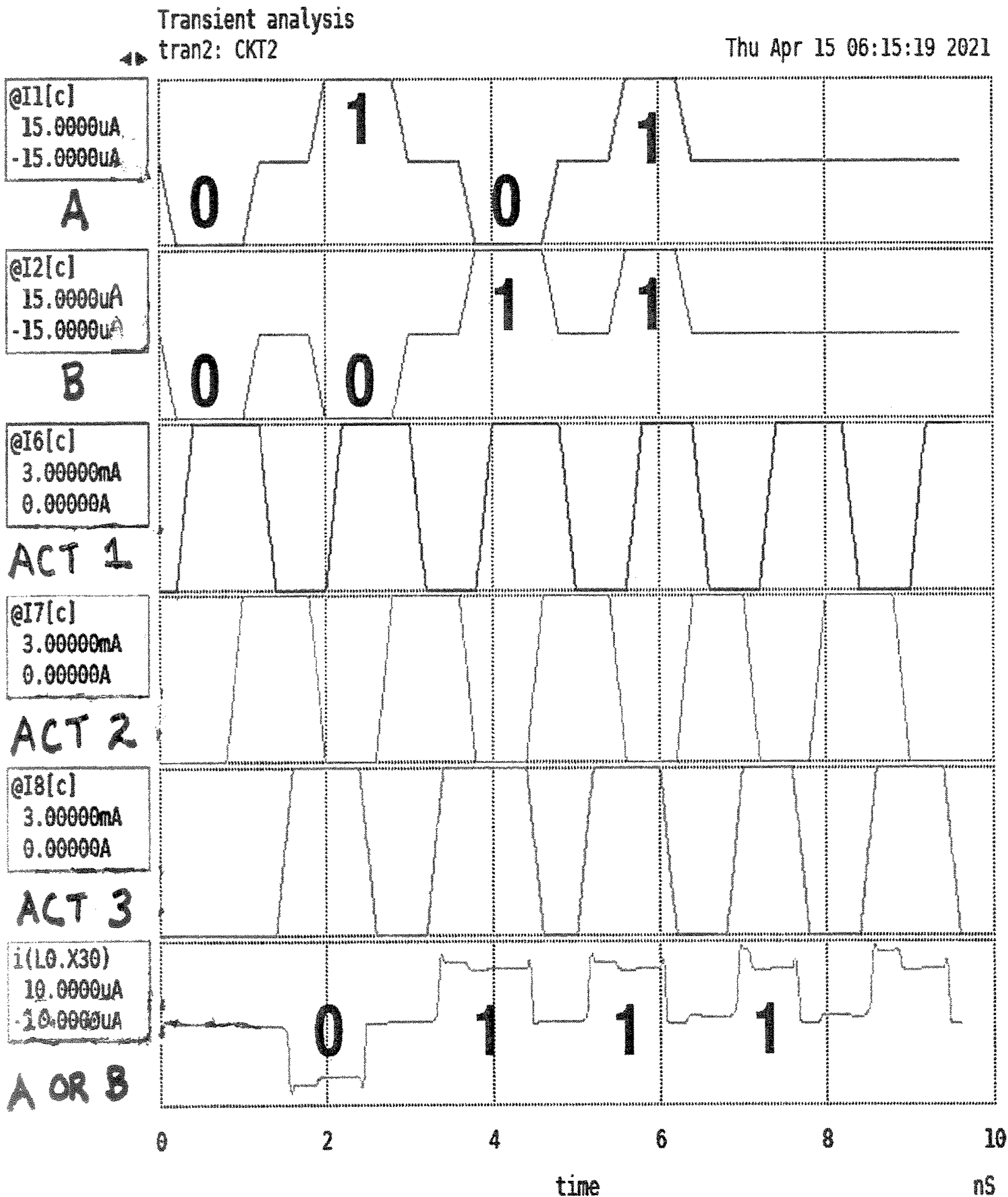
Figure 20C:
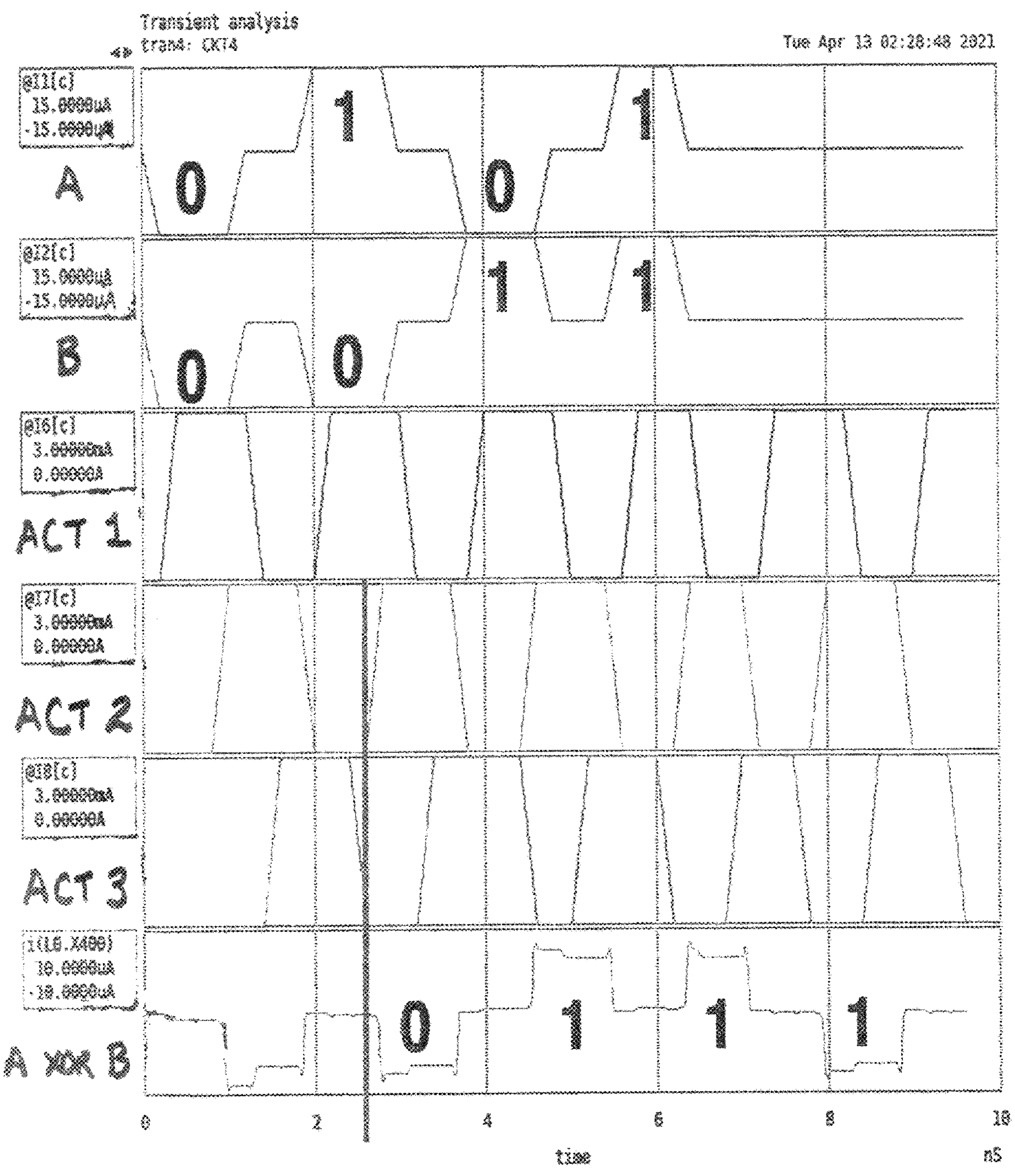

SPICE simulations were used for logic level verification of Super-DICE circuit designs. For the prior art AQFP logic gates, FIGS. 20A-C show the SPICE simulation output for the AND, OR, and XOR gates, respectively. For each view, the top two plots show the input current values, A and B. The next three plots show each of the activation current phases (ACT1 for $\varphi_1$, ACT2 for $\varphi_2$, and ACT3 for $\varphi_3$). The bottom plot shows the output current from the logic gate.

Energy performance was evaluated to determine the feasibility of the initial 10*s* order of magnitude power improvement assessment. The dynamic switching energy of a single QFP is on the order of 100 $k_bT$. Takeuchi et al. provide data for the bit energy dissipation across a single buffer QFP when 10 QFPs are fired in series for a range of rise/fall activation times [N. Takeuchi, K. Ehara, K. Inoue, Y. Yamanashi, and N. Yoshikawa, "Margin and energy dissipation of adiabatic quantum-flux-parametron logic at finite temperature", IEEE Transactions on Applied Superconductivity, vol. 23, no. 3, pp. 1700304-1700304, 2012]. The results are used to optimize QFP design parameters for the lowest bit energy, while maintaining wide enough operation margins for robust functionality at a finite temperature. The resulting optimized bit energy is $6.40\times10^{-21}$. The junction design parameters found are similar to what can be implemented with SFQ5ee fabrication technology. Therefore, it is reasonable to assume that QFPs designed and fabricated for the present invention can achieve similar energy dissipation values. Furthermore, given the adiabatic nature of AQFP, the energy dissipation depends on the switching speed, so a faster rising/falling time will result in higher energy dissipation, while a slower rising/falling time will be lower energy.

Table 2 provides a comparison of area (through JJ count), timing, and power performance of each circuit design. AQFP gates have energy interactions, so there will be slight differences in QFP switching energies depending on the circuit schematic. The energy projections are done assuming that each QFP has a dynamic switching energy of 100 $k_bT$, implying that activation cycles are run at about 5 GHz. For all of these values, it is assumed that all inductors cooled at 4K are lossless and values ignore dielectric energy loss in the activation ac-biasing lines. It should be noted, however, that the dielectric losses are a nontrivial factor to ignore because it is very likely that they dominate power dissipation for the chip. All of these values are the energy dissipation at 4K, cryogenic cooling power overhead is not taken into account, but multiplying each value by $10^3$ would estimate room temperature energy dissipation.

TABLE 2

| Circuit | JJ count | Activation cycles | Energy dissipation (a)) |
|---|---|---|---|
| BUF/INV/CONST | 2 | 1/3 | 0.00580 |
| AND/NAND/OR/NOR | 14 | 1 | 0.0406 |
| XOR | 20 | 2 | 0.232 |
| Phase Synchronizer | 12 | 1 | 0.0348 |
| C-element | 76 | 3 | 0.661 |
| Asymmetric(+) C-element | 130 | 4 | 1.51 |
| PCFB | 406 | 14 | 16.5 |
| QFBB 1 input | 66 | 2 | 0.383 |
| QFBB 2 input | 128 | 4 | 1.48 |
| Dual to Binary | 36 | 2 | 0.209 |

The energy dissipation value projects the total energy dissipated for one complete operation of the circuit. For example, the XOR gate consists of 20 QFPs that need to each fire twice for a full XOR computation (2 activation cycles), therefore an XOR operation costs 4000 $k_bT$. It is clear from Table 2 that the QFBB is preferred to the PCFB, because of its 84% shrink in number of Josephson junctions and 98% decrease in energy dissipation.

One of the major benefits of ALA is that when nothing is being computed, no work is being done, and no power is consumed. However, this is not the case with Super-DICE ALA because, in the current design, all the QFPs are fired on their respective activation phase, regardless of whether or not there is data present at their input. This is why there is no activity factor added to chip performance projections, like in typical CMOS dynamic power projections, because each QFP is active every cycle. This could be mitigated by introducing some type of activation signal gating mechanism to the token buffer, similar to clock gating methods in CMOS VLSI design.

At least the following devices and related aspects, implementations, modifications, and applications of the described technology are contemplated by the inventors and are considered to be within the scope of the presently disclosed invention: (1) phase synchronizer (FIG. 8); (2) QFP implementation of a C-element (FIG. 9); (3) QFP implementation of a PCFB (FIG. 11); (4) binary-encoded token passing mechanism for QFP logic (QFBB) (single input—FIG. 12; two-data input—FIG. 14; no acknowledgement—FIG. 15); and (5) dual-rail to binary token converter (FIG. 19).

While preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention.

What is claimed is:

1. A method for operation of Adiabatic Quantum Flux Parametron (AQFP) circuits, comprising:

accepting data arriving at any phase of a clock cycle;

synchronizing the accepted data to a known phase of a subsequent clock cycle; and providing the accepted and synchronized data to at least one Adiabatic Quantum Flux Parametron circuit during the known phase of the subsequent clock cycle, wherein the accepting and synchronizing of the data is performed by at least one phase synchronizer comprising a multiplexed array of Quantum Flex Parametron Buffers that samples each input phase of the clock cycle through a weak constant zero cell and outputs the logical OR of all input clock phases, propagating an input signal on any activation phase to a first phase output of the next activation cycle.

2. The method of claim 1, further comprising the step of passing the accepted and synchronized data from the phase synchronizer to at least one token-passing circuit, which passes the accepted and synchronized data to the Adiabatic Quantum Flux Parametron circuit during the known phase of the subsequent clock cycle.

3. The method of claim 1, wherein the accepting and synchronizing of the data is further performed by at least one token-passing circuit.

4. The method of claim 3, wherein the at least one token-passing circuit comprises at least one driving Quantum Flux Parametron circuit that is triggered by the presence of the accepted data and activates at least one variable activation Quantum Flux Parametron circuit to store the accepted data in a buffer or propagate it to the Adiabatic Quantum Flux Parametron circuit during the known phase of the subsequent clock cycle.

5. An asynchronous Adiabatic Quantum Flux Parametron (AQFP) device, comprising:

at least one Adiabatic Quantum Flux Parametron circuit; and at least one circuit adapted for accepting data arriving at any phase of a clock cycle and for synchronizing and providing the accepted data to the Adiabatic Quantum Flux Parametron circuit at a known phase of a subsequent clock cycle, wherein the circuit for accepting data comprises at least one activation phase synchronizer comprising a multiplexed array of Quantum Flex Parametron Buffers that samples each input phase of the activation cycle through a weak constant zero cell and outputs the logical OR of all input phases, propagating an input signal on any activation phase to a first phase output of the next activation cycle.

6. The device of claim 5, wherein the at least one activation phase synchronizer is specifically configured for:

accepting data input during any time of an activation cycle;

removing temporal uncertainty associated with the data input by propagating the value of the data input to an output signal of a known clock phase;

providing the output signal to at least one Adiabatic Quantum Flux Parametron circuit; and in the absence of an input signal, outputting a predetermined value.

7. The device of claim 5, wherein the circuit for accepting data further comprises at least one token-passing circuit.

8. The device of claim 7, wherein the at least one token-passing circuit comprises:

at least one driving Quantum Flux Parametron circuit, the driving Quantum Flux Parametron circuit being configured to be triggered by the presence of the accepted data; and a Quantum Flux Parametron circuit during the known phase of the subsequent clock cycle.

9. An activation phase synchronizer for asynchronous Adiabatic Quantum Flux Parametron (AQFP) operation, comprising:

circuitry configured for:

accepting data input during any time of an activation cycle;

removing temporal uncertainty associated with the data input by propagating the value of the data input to an output signal of a known clock phase;

providing the output signal to at least one Adiabatic Quantum Flux Parametron circuit; and in the absence of an input signal, outputting a predetermined value, wherein the circuitry comprises a multiplexed array of Quantum Flex Parametron Buffers that samples each input phase of the activation cycle through a weak constant zero cell and outputs the logical OR of all input phases, propagating an input signal on any activation phase to a first phase output of the next activation cycle.

10. The method of claim 2, wherein the at least one token-passing circuit comprises at least one driving Quantum Flux Parametron circuit that is triggered by the presence of the accepted data and activates at least one variable activation Quantum Flux Parametron circuit to store the accepted data in a buffer or propagate it to the Adiabatic Quantum Flux Parametron circuit during the known phase of the subsequent clock cycle.

* * * * *